United States Patent
Shibutani

(10) Patent No.: US 12,070,835 B2
(45) Date of Patent: *Aug. 27, 2024

(54) PLACING MEMBER

(71) Applicant: SEIKOH GIKEN Co., Ltd., Matsudo (JP)

(72) Inventor: Yuji Shibutani, Matsudo (JP)

(73) Assignee: SEIKOH GIKEN Co., Ltd., Matsudo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/842,786

(22) Filed: Jun. 17, 2022

(65) Prior Publication Data

US 2022/0347817 A1    Nov. 3, 2022

Related U.S. Application Data

(62) Division of application No. 16/073,807, filed as application No. PCT/JP2017/010174 on Mar. 14, 2017, now Pat. No. 11,389,926.

(30) Foreign Application Priority Data

Mar. 16, 2016  (JP) .................................. 2016-051874
Dec. 19, 2016  (JP) .................................. 2016-245415

(51) Int. Cl.
*B24B 41/06* (2012.01)
*B24B 19/22* (2006.01)
(Continued)

(52) U.S. Cl.
CPC .......... *B24B 41/067* (2013.01); *B24B 19/226* (2013.01); *B24B 27/0023* (2013.01);
(Continued)

(58) Field of Classification Search
CPC ..... B24B 41/067; B24B 19/226; B24B 19/22; B24B 27/0023; B24B 37/27; B24B 37/34
See application file for complete search history.

(56) References Cited

U.S. PATENT DOCUMENTS

| | | | |
|---|---|---|---|
| 2004/0110455 A1 | 6/2004 | Yamada et al. | |
| 2005/0013550 A1* | 1/2005 | Hung .................... | B24B 19/226 385/85 |
| 2009/0060443 A1 | 3/2009 | Fredrickson et al. | |

FOREIGN PATENT DOCUMENTS

| | | | | |
|---|---|---|---|---|
| AU | 2014240274 A1 * | 4/2016 | ............. | B24B 19/22 |
| JP | 2-47137 U | 3/1990 | | |

(Continued)

OTHER PUBLICATIONS

International Search Report for PCT/JP2017/010174 dated May 23, 2017.
PCT written opinion dated May 23, 2017.

*Primary Examiner* — Makena S Markman
(74) *Attorney, Agent, or Firm* — Yokoi & Co., U.S.A.; Toshiyuki Yokoi

(57) ABSTRACT

Provided is an optical fiber ferrule polishing jig capable of fixing an optical fiber ferrule and releasing the optical fiber ferrule. An optical fiber ferrule polishing jig 10A has; a base 12a having insertion holes 20 into which optical fiber ferrules 51 can be detachably inserted; pivoting rods 13 which are adjacent to the insertion holes 20 of the base 12a and rotatable around lower end portions 36; fixing pieces 14a installed in installation recesses 19a formed in the base 12a to fix the optical fiber ferrules 51 with respect to the insertion holes 20 by being moved as the rods are pivoted; and a plurality of coil springs 15a installed in the installation recesses 19a to bias the fixing pieces 14a so as to release fixing of the optical fiber ferrules 51 with respect to the insertion holes 20.

10 Claims, 14 Drawing Sheets

(51) Int. Cl.
- *B24B 27/00* (2006.01)
- *B24B 37/27* (2012.01)
- *B24B 37/34* (2012.01)
- *G02B 6/36* (2006.01)
- *G02B 6/38* (2006.01)

(52) U.S. Cl.
CPC ............... *B24B 37/27* (2013.01); *G02B 6/36* (2013.01); *B24B 37/34* (2013.01); *G02B 6/3863* (2013.01); *G02B 6/3866* (2013.01)

(56) References Cited

FOREIGN PATENT DOCUMENTS

| | | |
|---|---|---|
| JP | 2004-181608 A | 7/2004 |
| JP | 2004-261898 A | 9/2004 |

\* cited by examiner ical fiber ferrule polishing jig used for polishing an optical fiber ferrule and a placing member installed on a base of the optical fiber ferrule polishing jig used for polishing a plurality of optical fiber ferrules.

PLACING MEMBER

TECHNICAL FIELD

The present invention relates to an optical fiber ferrule polishing jig used for polishing an optical fiber ferrule and a placing member installed on a base of the optical fiber ferrule polishing jig used for polishing a plurality of optical fiber ferrules.

BACKGROUND ART

Patent Document 1 discloses an optical fiber ferrule polishing jig comprising: a polishing jig body having many insertion holes to insert optical fiber ferrules; seats having a wall surface spaced at a predetermined distance from the insertion holes and extending along one side of the insertion holes; and supporting walls located on the opposite side of the seat with respect to the insertion holes and extending vertically from the insertion hole, wherein the seat has a holding member which is capable of being slid in a direction for adjusting the interval between the holding member and the supporting wall of the insertion holes, the holding member having a holding portion at the frontward of the holding member confronting the supporting wall and having an inclined face at the backward of the holding member, the inclined face being parallel to the wall surface of the seat and inclined down toward the wall of the seat, a bolt and a washer for pressing down a rod member arranged on the inclined face of the holding member of the seat are provided on the polishing jig body at an outside of the wall surface of the seat, when the bolt is tightened downward, the washer presses the rod member downward and the rod member descends along the wall surface of the seats, and the holding member is pushed forward and the optical fiber ferrule is clamped between the holding portion and the supporting wall.

In the above described optical fiber ferrule polishing jig, the holding member is biased to the direction in which the holding member is pulled away from the support wall by the biasing force of a coil spring. Therefore, when the bolt is loosened, the holding portion retracts from the insertion hole. When the optical fiber ferrule is inserted into the insertion hole and the bolt is screwed in the above described state, the washer presses the rod member downwardly, then the rod member descends along the wall surface of the seat. As the rod member goes down, the downward pressing force acts on the inclined surface of the holding member and the holding member is extruded forward. Then, the holding portion of the holding member pushes the side of the optical fiber ferrule. Accordingly, the optical fiber ferrule is fixed to the insertion hole in a state in which optical fiber ferrule is sandwiched by the holding portion and the supporting wall. When the bolt is loosened in a state in which the optical fiber ferrule is fixed to the insertion hole, the holding member moves backward by the biasing force of the coil spring. Thus, the pressing force to the side of the optical fiber ferrule by the holding portion of the holding member is released, and the optical fiber ferrule is released from the insertion hole.

PRIOR ART DOCUMENTS

Patent Documents

Patent Document 1: Japanese Patent Application Laid-Open No. 2004-181608

DISCLOSURE OF THE INVENTION

Problems to be Solved by the Invention

In the optical fiber ferrule polishing jig disclosed in Patent Document 1, when each optical fiber ferrule is fixed to each insertion hole, the bolt needs to be screwed by a clamping tool such as a wrench or a driver. Thus, labor and time are required to fix the optical fiber ferrule with respect to the insertion hole. In addition, when each optical fiber ferrule is released from each insertion hole, the screwed bolt needs to be loosened by the clamping tool. Thus, labor and time are also required to release fixing of the optical fiber ferrule from the insertion hole. When the bolt is screwed by hand using the clamping tool, the driving torque is not constant. Thus, the pressing force applied to the side face of the optical fiber ferrules may be different between one holding member and the other holding member. In such a case, fixing conditions of the optical fiber ferrules may be different depending on the insertion holes to be inserted. When the fixing conditions of the optical fiber ferrules fixed to each insertion hole are different, the optical fiber ferrules may not be polished equally at the time of polishing the optical fiber ferrules by a grinder.

The object of the present invention is to provide an optical fiber ferrule polishing jig capable of fixing and releasing an optical fiber ferrule without requiring labor and time, capable of fixing the optical fiber ferrule easily, and capable of releasing the optical fiber ferrule easily. Another object of the present invention is to provide an optical fiber ferrule polishing jig capable of polishing the optical fiber ferrules equally under the same fixed condition. Another object of the present invention is to provide a placing member for achieving easy fixing and easy releasing of an optical fiber ferrule without requiring labor and time.

Means for Solving the Problem

The first precondition of the present invention to solve the above problems is an optical fiber ferrule polishing jig used for polishing a plurality of optical fiber ferrules.

In the first precondition of the present invention, the optical fiber ferrule polishing jig has: a base having a predetermined area; insertion holes formed in the base so that optical fiber ferrules can be detachably inserted into the insertion holes; pivoting rods, each of the pivoting rods being adjacent to each of the insertion holes of the base, each of the pivoting rods having an upper end portion, a lower end portion and an intermediate portion, each of the pivoting rods being rotatable around the lower end portion; installation portions formed between each of the insertion holes of the base and each of the pivoting rods; fixing pieces installed in each of the installation portions of the base, the fixing pieces being moved as the pivoting rods are pivoted so as to fix the optical fiber ferrules with respect to the insertion holes; and biasing units for biasing the fixing pieces, each of the biasing units being installed in each of the installation portions of the base so as to release fixing of the optical fiber ferrules with respect to the insertion holes.

In an example of the optical fiber ferrule polishing jig of the present invention, the optical fiber ferrule polishing jig further has a raised portion formed into a flat-convex shape with a predetermined thickness, the spring portion being located on the base, wherein the raised portion has: an upright support portion for supporting the intermediate portion of each of the pivoting rods to support each of the pivoting rods in an upright state; a pivot-opening which communicates with the upright support portion; and an inclined support portion which communicates with the pivot-opening to support each of the pivoting rods in an inclined state.

In another example of the optical fiber ferrule polishing jig of the present invention, the optical fiber ferrule polishing jig further has: a slide lock which is slid in the axial direction of each of the pivoting rods in a state of being inserted around each of the pivoting rods; and a lock hole formed in the upright support portion of the raised portion, wherein a lower end portion of the slide lock enters the lock hole when the pivoting rod is in the upright state.

In another example of the optical fiber ferrule polishing jig of the present invention, the raised portion has a pivoting portion surrounding the pivot-opening.

In another example of the optical fiber ferrule polishing jig of the present invention, the optical fiber ferrule polishing jig further has: a coil spring inserted around each of the pivoting rods and extending between the upper end portion of each of the pivoting rods and the slide lock so that the coil spring biases the slide rock toward the bottom end of each of the pivoting rods.

In another example of the optical fiber ferrule polishing jig of the present invention, the installation portions are installation recesses recessed downward from an upper surface of the base, each of the fixing pieces has: a front portion facing each of the insertion holes; a top portion facing a bottom end of each of the pivoting rods; a bottom portion abutting with each of the installation recesses of the base; and a moving shaft extending backward from the bottom portion and disposed in a shaft hole formed in each of the installation recesses of the base, and each of the pivoting rods has a pressing protrusion formed at a bottom end of each of the pivoting rods so as to be convex toward each of the fixing pieces to press the top portion of each of the fixing pieces.

In another example of the optical fiber ferrule polishing jig of the present invention, the top portion of each of the fixing pieces has an inclined surface gradually inclined downwardly from the front portion to the backward of each of the fixing pieces.

In another example of the optical fiber ferrule polishing jig of the present invention, the front portion of each of the fixing pieces has an engagement portion recessed backward of each of the fixing pieces.

In another example of the optical fiber ferrule polishing jig of the present invention, each of the biasing units is a coil spring extending vertically and housed in a spring installation hole formed at the bottom portion of each of the fixing pieces, the spring installation hole extending vertically.

In another example of the optical fiber ferrule polishing jig of the present invention, the raised portion extends annularly to form a torus shape, and the insertion holes of the base, the installation recesses of the base, the pivoting rods, and the fixing pieces are circularly arranged along the raised portion.

In another example of the optical fiber ferrule polishing jig of the present invention, the installation portions are installation holes penetrating the upper surface and a lower surface of the base, and each of the fixing pieces has: a front portion facing each of the insertion holes of the base; a top portion facing a bottom end of each of the pivoting rods; a bottom portion located below each of the installation holes of the base; both side portions facing both side surfaces of each of the installation holes of the base; and a rotating shaft extending laterally from the both side portions and disposed in a shaft hole formed in each of the installation holes of the base, and each of the pivoting rods has a pressing protrusion formed at a bottom end of each of the pivoting rods so as to be convex toward each of the fixing pieces to press the top portion of each of the fixing pieces.

In another example of the optical fiber ferrule polishing jig of the present invention, each of the biasing units is a flat spring for biasing each of the fixing pieces upward and the flat spring has: a base portion located between the upper surface of the base and a lower surface of the raised portion; and a spring portion connected to the base portion, the spring portion extending between the adjacent installation holes, the spring portion being located on the upper surface of the base, the front portion of each of the fixing pieces has: an engagement portion recessed backward of each of the fixing pieces; and a curved surface connected to the engagement portion and curved toward the bottom portion or an inclined surface connected to the engagement portion and inclined downward toward the bottom portion, the top portion of each of the fixing pieces has an inclined surface which is gradually inclined downwardly from the front portion to the backward of each of the fixing pieces, the both side portions of each of the fixing pieces have abutment portions which abut with the spring portion of the flat spring extending between the adjacent installation holes, the spring portion being located on the upper surface of the base.

In another example of the optical fiber ferrule polishing jig of the present invention, the raised portion extends annularly to form a torus shape, the insertion holes of the base, the installation holes of the base, the pivoting rods, and the fixing pieces are circularly arranged along the raised portion, the base portion of the flat spring extends annularly along the raised portion to form a toms shape, and the spring portions of the flat spring are circularly arranged along the raised portion.

The second precondition of the present invention to solve the above problems is a placing member installed on a base of an optical fiber ferrule polishing jig used for polishing a plurality of optical fiber ferrules.

In the second precondition of the present invention, the placing member has: a raised portion formed into a flat-convex shape with a predetermined thickness; pivoting rods; and a slide lock which is slid in the axial direction of each of the pivoting rods in a state of being inserted around each of the pivoting rods, each of the pivoting rods having an upper end portion, a lower end portion and an intermediate portion, and installed in the raised portion so as to be capable of being pivoted around the lower end portion, the raised portion has: an upright support portion for supporting the intermediate portion of each of the pivoting rods to support each of the pivoting rods in an upright state; a pivot-opening which communicates with the upright support portion; and an inclined support portion which communicates with the pivot-opening to support each of the pivoting rods in an inclined state, the placing member has a lock hole formed in the upright support portion of the raised portion, and a lower end portion of the slide lock enters the lock hole when each of the pivoting rods is in the upright state.

In an example of the placing member of the present invention, the raised portion has: an upright support portion for supporting the intermediate portion of each of the pivoting rods to support each of the pivoting rods in an upright state; a pivot-opening which communicates with the upright support portion; and an inclined support portion which communicates with the pivot-opening to support each of the pivoting rods in an inclined state.

In another example of the placing member of the present invention, the placing member has: a slide lock which is slid in the axial direction of each of the pivoting rods in a state of being inserted around each of the pivoting rods; and a lock hole formed in the upright support portion of the raised portion, and a lower end portion of the slide lock enters the lock hole when each of the pivoting rods is in the upright state.

In another example of the placing member of the present invention, the raised portion has a pivoting portion surrounding the pivot-opening.

In another example of the placing member of the present invention, the placing member further has a coil spring inserted around each of the pivoting rods and extending between the upper end portion of each of the pivoting rods and the slide lock so that the coil spring biases the slide rock toward the bottom end of each of the pivoting rods.

In another example of the placing member of the present invention, the raised portion extends annularly to form a toms shape, and the pivoting rods are circularly arranged in the raised portion.

Effects of the Invention

According to the optical fiber ferrule polishing jig of the present invention, the optical fiber ferrules are fixed into the insertion holes by the fixing pieces, which are moved as the pivoting rods are pivoted. Thus, it is possible to fix the optical fiber ferrules with respect to the insertion holes only by the operation of pivoting the pivoting rods. Compared with the prior art in which the bolt is screwed by clamping tools such as a wrench or a driver, the present invention does not require labor and time for fixing the optical fiber ferrules with respect to the insertion holes. Accordingly, it is possible to fix the optical fiber ferrules with respect to the insertion holes simply and easily. According to the optical fiber ferrule polishing jig, when the pivoting rods are pivoted, the fixing pieces are moved to release fixing of the optical fiber ferrules by the biasing force of the biasing units, and the fixing of the optical fiber ferrules by the fixing piece is released. Therefore, the fixing of the optical fiber ferrules with respect to the insertion holes by the fixing pieces can be released only by the operation of pivoting the pivoting rods. Compared with the prior art in which the bolt is loosened by clamping tools such as a wrench or a driver, the present invention does not require labor and time for releasing the optical fiber ferrules from the insertion holes and allows the optical fiber ferrules to be released simply and easily. According to the optical fiber ferrule polishing jig, the biasing force of the biasing units maintain the moved state of the fixing pieces and maintains the open state of the insertion holes. Therefore, it is possible to smoothly insert each optical fiber ferrule with respect to the insertion holes, and to smoothly remove each optical fiber ferrule from the insertion holes. According to the optical fiber ferrule polishing jig, the optical fiber ferrules are fixed to each insertion hole by the fixing pieces, and the fixing condition of each optical fiber ferrule with respect to each insertion holes can be the same in all the optical fiber ferrules. Thus, it is possible to perform polishing the optical fiber ferrules uniformly.

According to the optical fiber ferrule polishing jig, the optical fiber ferrule polishing jig has the raised portion formed into a flat-convex shape with a predetermined thickness, the raised portion being located on the base, and the raised portion has: an upright support portion for supporting the intermediate portion of the pivoting rod to support the pivoting rod in the upright state; a pivot-opening which communicates with the upright support portion; and an inclined support portion which communicates with the pivot-opening to support the pivoting rod in the inclined state. Thus, the upright support portion of the raised portion on the base supports the pivoting rod in the upright state. When each of the pivoting rods is in the upright state and the optical fiber ferrule is fixed with respect to the insertion hole, it is possible to maintain the fixing of the optical fiber ferrule with respect to the insertion hole by the fixing piece. According to the optical fiber ferrule polishing jig, each of the pivoting rods is supported in the inclined state by the inclined support portion of the raised portion of the base. Therefore, when each of the pivoting rods is in the inclined state and the optical fiber ferrule is released from the insertion hole, both the released state of the fixing piece in the insertion hole and the open state of the insertion hole are maintained. Thus, it is possible to smoothly insert the optical fiber ferrule with respect to the insertion hole, and smoothly remove each optical fiber ferrule from the insertion hole.

According to the optical fiber ferrule polishing jig, the optical fiber ferrule polishing jig has: a slide lock which is slid in the axial direction of the pivoting rod in a state of being inserted around the pivoting rod; and a lock hole formed in the upright support portion of the raised portion, and a lower end portion of the slide lock enters the lock hole when the pivoting rod is in the upright state. Thus, the upright state of the pivoting rod is maintained by the slide lock. Therefore, the pivoting rod is not pivoted from the upright state to the inclined state. Accordingly, when the optical fiber ferrule is fixed to the insertion hole and the pivoting rod is in the upright state, the fixing of the optical fiber ferrule to the insertion hole is not carelessly released, and it is possible to surely maintain the fixing of the optical fiber ferrule with respect to the insertion hole by the fixing piece.

According to the optical fiber ferrule polishing jig, the raised portion has a pivoting portion surrounding the pivot-opening. Thus, the pivoting rod pivots while the lower end portion of the slide lock rides on the pivoting portion. Therefore, the pivoting rod can be accurately pivoted along the pivoting portion. Accordingly, it is possible to smoothly fix the optical fiber ferrule to the insertion hole and smoothly release fixing of the optical fiber ferrule with respect to the insertion hole.

According to the optical fiber ferrule polishing jig, the optical fiber ferrule polishing jig has a coil spring inserted around the pivoting rod and extending between the upper end portion of the pivoting rod and the slide lock so that the coil spring biases the slide rock toward the bottom end of the pivoting rod. Thus, the entered state of the lower end portion of the slide lock with respect to the lock hole is maintained by the biasing force of the coil spring, and the upright state of the pivoting rod is maintained by the slide lock. Therefore, the pivoting rod is not pivoted from the upright state to the inclined state. When the pivoting rod is in the upright state and the optical fiber ferrule is fixed to the insertion hole, the fixing of the optical fiber ferrule to the insertion hole is not carelessly released, and it is possible to surely maintain the fixing of the optical fiber ferrule with respect to the insertion hole by the fixing piece.

According to the optical fiber ferrule polishing jig, the installation portions are installation recesses recessed downward from an upper surface of the base, each of the fixing pieces has: a front portion facing each of the insertion holes of the base; a top portion facing the bottom end of each of the pivoting rods; a bottom portion abutting with each of the installation recesses of the base; and a moving shaft extending backward from the bottom portion and disposed in a shaft hole formed in each of the installation recesses of the base, and each of the pivoting rods has a pressing protrusion formed at the bottom end of each of the pivoting rods so as to be convex toward each of the fixing pieces to press the top portion of each of the fixing pieces. Thus, when the pivoting rod is pivoted, the pressing protrusion of the pivoting rod, which abuts with the top portion of the fixing pieces installed in the installation recess, presses the fixing piece. At the same time, the pressing protrusion moves the fixing piece by resisting the biasing force of the biasing unit. Accordingly, it is possible to surely move the fixing piece around the moving shaft by pivoting the pivoting rod, and to surely fix the optical fiber ferrule to the insertion hole by using the fixing piece.

According to the optical fiber ferrule polishing jig, the top portion of each of the fixing pieces has an inclined surface gradually inclined downwardly from the front portion to the backward of each of the fixing pieces. Thus, when the pivoting rod is pivoted, the pressing protrusion of the pivoting rod slides and presses downward the inclined surface of the fixing piece installed in the installation recess. At that time, the pressing protrusion can move the fixing piece by resisting the biasing force of the biasing unit. Accordingly, the pressing protrusion of the pivoting rod can surely move the fixing piece around the moving shaft, and it is possible to surely fix the optical fiber ferrule with respect to the insertion hole by using the fixing piece.

According to the optical fiber ferrule polishing jig, the front portion of each of the fixing pieces has an engagement portion recessed backward of each of the fixing pieces. Thus, when the pivoting rod is pivoted, the optical fiber ferrule fits in the engagement portion formed in the front portion of the fixing piece. Accordingly, it is possible to fix the optical fiber ferrule with respect to the insertion hole so as not to be moved freely by the engagement portion of the fixing piece. According to the optical fiber ferrule polishing jig, the optical fiber ferrules are fixed to the insertion holes so as not to be moved freely by the engagement portion of the fixing pieces. Therefore, the fixing condition of each optical fiber ferrule with respect to each insertion hole can be the same in all the optical fiber ferrules, and it is possible to uniformly perform polishing the optical fiber ferrules.

According to the optical fiber ferrule polishing jig, each of the biasing units is a coil spring extending vertically and housed in a spring installation hole formed at the bottom portion of each of the fixing pieces, the spring installation hole extending vertically. Thus, when the pivoting rod is pivoted, the fixing piece is moved by the biasing force of the coil spring so as to release fixing of the optical fiber ferrule. Therefore, the fixing piece can be surely moved around the moving shaft by the coil spring. Accordingly, it is possible to surely release fixing of the optical fiber ferrule with respect to the insertion hole by the fixing piece by using the coil spring. According to the optical fiber ferrule polishing jig, the moved state of the fixing piece is maintained by the biasing force of the coil spring and the open state of the insertion hole can be maintained. Thus, it is possible to smoothly insert each optical fiber ferrule into each insertion hole and to smoothly remove each optical fiber ferrule from each insertion hole.

According to the optical fiber ferrule polishing jig, the raised portion extends annularly to form a torus shape and the insertion holes of the base, the installation recesses of the base, the pivoting rods, and the fixing pieces are circularly arranged along the raised portion. Thus, each optical fiber ferrule is fixed to each insertion hole by the circularly arranged fixing pieces which are moved as the circularly arranged pivoting rods are pivoted. Therefore, each optical fiber ferrule can be fixed to each insertion hole only by the operation of pivoting the pivoting rods. Accordingly, it is possible to fix optical fiber ferrules to circularly arranged insertion holes without requiring labor and time, and it is also possible to simply and easily fix each optical fiber ferrule to each insertion hole. According to the optical fiber ferrule polishing jig, when the pivoting rods are pivoted, circularly arranged fixing pieces are moved so as to release fixing of each optical fiber ferrule by the biasing force of the biasing units, and the fixing of each optical fiber ferrule by the fixing pieces is released. Therefore, it is possible to release fixing of each optical fiber ferrule with respect to each insertion hole by the fixing pieces only by the operation of pivoting the pivoting rods. Thus, the fixing of the optical fiber ferrules to the circularly arranged insertion holes can be released without requiring labor and time, and it is possible to simply and easily release fixing of the optical fiber ferrules.

According to the optical fiber ferrule polishing jig, the installation portions are installation holes penetrating the upper surface and a lower surface of the base and each of the fixing pieces has: a front portion facing each of the insertion holes of the base; a top portion facing the bottom end of each of the pivoting rods; a bottom portion located below each of the installation holes of the base; both side portions facing both side surfaces of each of the installation holes of the base; and a rotating shaft extending laterally from the both side portions and disposed in the shaft hole formed in each of the installation holes of the base, and the pivoting rod has a pressing protrusion formed at the bottom end of each of the pivoting rods so as to be convex toward each of the fixing pieces to press the top portion of each of the fixing pieces. Thus, when the pivoting rod is pivoted, the pressing protrusion of the pivoting rod, which abuts with the top portion of the fixing pieces installed in the installation hole, presses the fixing piece. At the same time, the fixing piece is moved by resisting the biasing force of the biasing unit. Accordingly, the fixing piece can be surely moved around the rotating shaft by pivoting the pivoting rod, and it is possible to surely fix the optical fiber ferrule with respect to the insertion hole by using the fixing piece.

According to the optical fiber ferrule polishing jig, each of the biasing units is a flat spring for biasing each of the fixing pieces upward, and the flat spring has: a base portion located between the upper surface of the base and the lower surface of the raised portion; a spring portion connected to the base portion, the spring portion extending between the adjacent installation holes, the spring portion being located on the upper surface of the base, the front portion of each of the fixing pieces has: an engagement portion recessed backward of each of the fixing pieces; and a curved surface connected to the engagement portion and curved toward the bottom portion or an inclined surface connected to the engagement portion and inclined downwardly toward the bottom portion, and the top portion of each of the fixing pieces has an inclined surface gradually inclined downwardly from the front portion to the backward of each of the fixing pieces, and both side portions of each of the fixing pieces have abutment portions which abut with the spring portion of the flat spring, the spring portion extending between the adjacent installation holes, the spring portion being located on the upper surface of the base. Thus, when the pivoting rod is pivoted, the fixing piece is pivoted (moved) by the biasing force of the spring portion of the flat spring so as to release fixing of the optical fiber ferrule.

Therefore, the fixing piece can be surely pivoted (moved) around the rotating shaft by using the coil spring. Accordingly, it is possible to surely release fixing of the optical fiber ferrule with respect to the insertion hole by the fixing piece by using the coil spring. According to the optical fiber ferrule polishing jig, the pivoted (moved) state of the fixing piece can be maintained, and the open state of the insertion hole can be maintained by the biasing force of the coil spring. Therefore, it is possible to smoothly insert each optical fiber ferrule to the insertion hole, and to smoothly remove each optical fiber ferrule from the insertion hole. According to the optical fiber ferrule polishing jig, the front portion of each of the fixing pieces has the engagement portion recessed backward. Therefore, when the pivoting rod is pivoted, the optical fiber ferrule fits in the engagement portion formed in the front portion of the fixing piece. Thus, it is possible to fix the optical fiber ferrule with respect to the insertion hole so as not to be moved freely by the engagement portion of the fixing piece. According to the optical fiber ferrule polishing jig, the optical fiber ferrules are fixed with respect to the insertion holes so as not to be moved freely by the engagement portions of the fixing pieces. Therefore, the fixing condition of each optical fiber ferrule with respect to each insertion hole can be the same in all the optical fiber ferrules, and it is possible to uniformly perform the polishing of the optical fiber ferrules. According to the optical fiber ferrule polishing jig, the front portion of the fixing piece has the curved surface connected to the engagement portion and curved toward the bottom portion or inclined surface connected to the engagement portion and inclined downwardly toward the bottom portion, and the top portion of the fixing piece has the inclined surface inclined downwardly from the front portion to the backward of the fixing piece.

Therefore, when the pivoting rod is pivoted, the pressing protrusion of the pivoting rod slides on and presses the inclined surface of the fixing piece installed in the installation recess. Thus, the fixing piece can be pivoted (moved) by resisting the biasing force of the biasing unit, and the fixing piece can be surely pivoted (moved) around the rotating shaft by the pressing protrusion of the pivoting rod. Accordingly, it is possible to surely fix the optical fiber ferrule to the insertion hole by using the fixing piece.

According to the ferrule polishing jig, the raised portion extends annularly to form a toms shape, the insertion holes of the base, the installation holes of the base, the pivoting rods and the fixing pieces are circularly arranged along the raised portion, the base portion of the flat spring extends annularly along the raised portion to form a torus shape, and the spring portions of the flat spring are circularly arranged along the raised portion. Thus, the circularly arranged the fixing pieces, which are pivoted as the circularly arranged pivoting rods are pivoted, fix each optical fiber ferrule to each insertion hole. Therefore, it is possible to fix each optical fiber ferrule with respect to each insertion hole only by the operation of pivoting the pivoting rods. Accordingly, the optical fiber ferrules can be fixed with respect to circularly arranged insertion holes without requiring labor and time, and it is possible to simply and easily fix the optical fiber ferrules with respect to each insertion hole. According to the optical fiber ferrule polishing jig, when the pivoting rods are pivoted, circularly arranged fixing pieces are moved so as to release fixing of each optical fiber ferrule by the biasing force of the spring portion of the flat spring and the fixing of each optical fiber ferrule by the fixing pieces can be released. Therefore, the fixing of each optical fiber ferrule with respect to the insertion hole by the fixing pieces can be released only by the operation of pivoting the pivoting rods. Thus, the fixing of the optical fiber ferrules to circularly arranged insertion holes can be released without requiring labor and time, and it is possible to simply and easily release fixing of the optical fiber ferrules. According to the optical fiber ferrule polishing jig, when the pivoting rod is pivoted, the circularly arranged fixing pieces are moved by the biasing force of the circularly arranged spring portions of the flat spring so as to release fixing of the optical fiber ferrule. Therefore, the fixing pieces can be surely pivoted (moved) around the rotating shaft by the spring portion of the flat spring. Thus, it is possible to surely release fixing of the optical fiber ferrule with respect to the insertion hole by the fixing piece by using the spring portion of the flat spring.

According to the optical fiber ferrule polishing jig, the moved state of the fixing pieces can be maintained by the biasing force of the spring portions of the flat spring, and at the same time, the open state of the circularly arranged insertion holes can be maintained. Therefore, it is possible to smoothly insert the optical fiber ferrules into the insertion holes, and to smoothly remove the optical fiber ferrules from the insertion holes.

According to the placing member of the present invention, the pivoting rods pivotably installed in the raised portion are used to fix the optical fiber ferrule to the base of the optical fiber ferrule polishing jig. With this configuration, the optical fiber ferrule can be fixed to the base only by pivoting the pivoting rod in the raised portion and the optical fiber ferrule can be released from the base only by pivoting the pivoting rod in the raised portion. Thus, it is possible to achieve fixing and releasing of the optical fiber ferrule in the base only by the pivot operation of the pivoting rod without requiring labor and time.

According to the placing member, the raised portion has: an upright support portion for supporting the intermediate portion of each of the pivoting rods to support each of the pivoting rods in an upright state; a pivot-opening which communicates with the upright support portion; and an inclined support portion which communicates with the pivot-opening so as to support each of the pivoting rods in an inclined state. For example, when the optical fiber ferrule is fixed to the base of the optical fiber ferrule polishing jig while the pivoting rod is in the upright state, the pivoting rod is supported in the upright state by the upright support portion of the raised portion of the base. Therefore, the fixing of the optical fiber ferrule in the base can be maintained. According to the placing member, for example, when the fixing of optical fiber ferrule in the base is released while the pivoting rod is in the inclined state, the pivoting rod is supported in the inclined state. Therefore, the released state of the optical fiber ferrule of the base can be maintained by the inclined support portion of the raised portion of the base.

According to the placing member, the placing member has: a slide lock which is slid in the axial direction of the pivoting rod in a state of being inserted around the pivoting rod; and a lock hole formed in the upright support portion of the raised portion, wherein a lower end portion of the slide lock enters the lock hole when the pivoting rod is in the upright state. For example, when the optical fiber ferrule is fixed to the base of the optical fiber ferrule polishing jig while the pivoting rod is in the upright state, the upright state of the pivoting rod can be maintained by the slide lock. Therefore, the fixing of the optical fiber ferrule in the base can be maintained.

According to the placing member, the raised portion has a pivoting portion surrounding the pivot-opening. When the pivoting rod pivots while the lower end portion of the slide lock rides on the pivoting portion, the pivoting rod can be accurately pivoted along the pivoting portion. Therefore, it is possible to smoothly fix the optical fiber ferrule to the base, and to smoothly release fixing of the optical fiber ferrule with respect to the base.

According to the placing member, the placing member further has a coil spring inserted around the pivoting rods and extending between the upper end portion of each of the pivoting rods and the slide rock so that the coil spring biases the slide rock toward a bottom end of the pivoting rods. For example, when the optical fiber ferrule is fixed to the base of the optical fiber ferrule polishing jig while the pivoting rod is in the upright state, the entered state of the lower end portion of the slide lock with respect to the lock hole is maintained by the biasing force of the coil spring, and the upright state of the pivoting rod is maintained by the slide lock. Therefore, it is possible to surely maintain the fixing of the optical fiber ferrule in the base.

According to the placing member, the raised portion extends annularly to form a torus shape, and the pivoting rods are circularly arranged in the raised portion. Therefore, the circularly arranged pivoting rods in the raised portion are used to fix the optical fiber ferrule to the base of the optical fiber ferrule polishing jig. Thus, a plurality of the optical fiber ferrules can be fixed to the base by pivoting the circularly arranged pivoting rods in the raised portion, and the fixing of a plurality of optical fiber ferrules to the base can be released by pivoting the pivoting rods in the raised portion. Accordingly, it is possible to achieve the fixing and the releasing of a plurality of optical fiber ferrules in the base only by the pivot operation of the pivoting rods without requiring labor and time.

MODES FOR CARRYING OUT THE INVENTION

Figure 1:
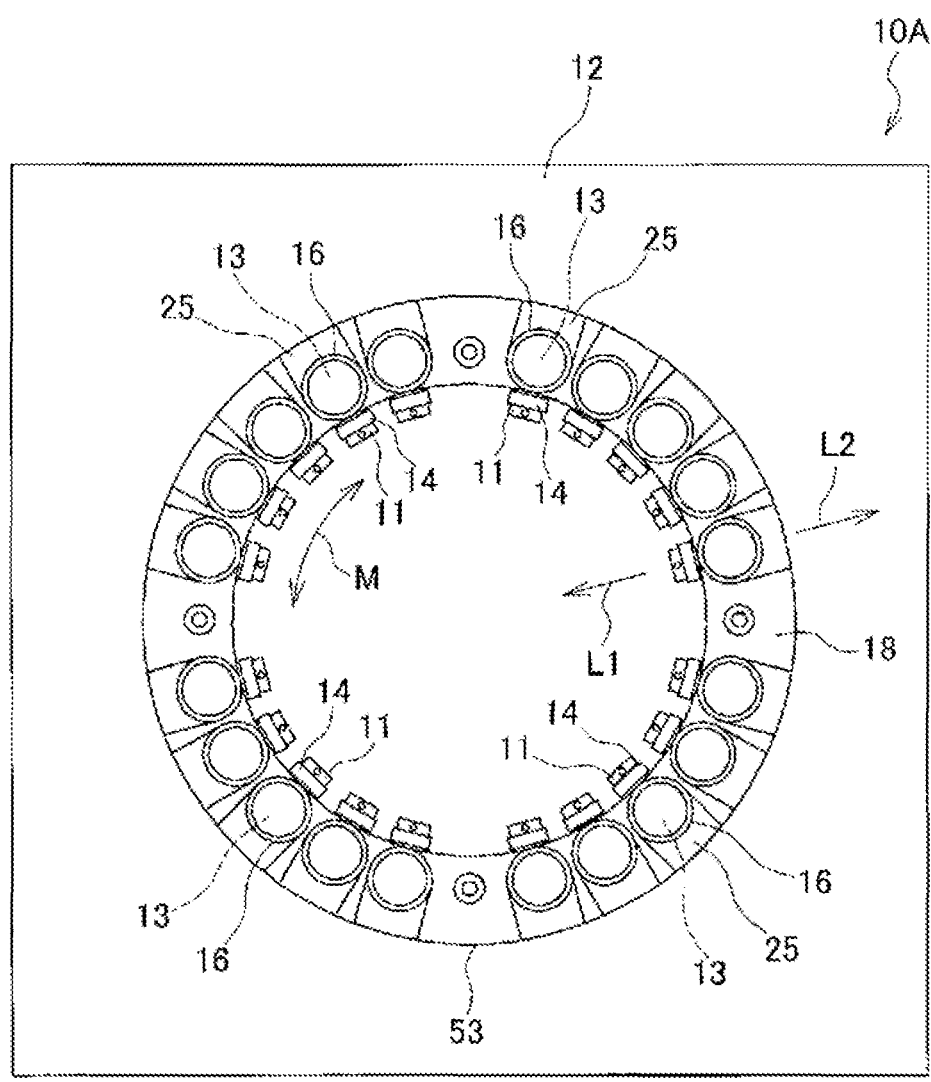
FIG. 1 is a top view of an optical fiber ferrule polishing jig shown as an example.
Figure 2:
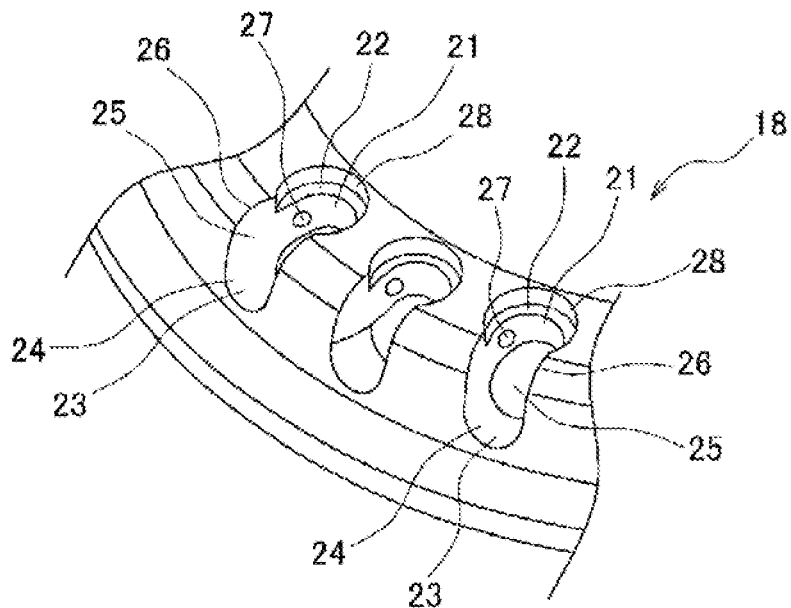
FIG. 2 is a partially enlarged perspective view of a raised portion of a base.
Figure 3:
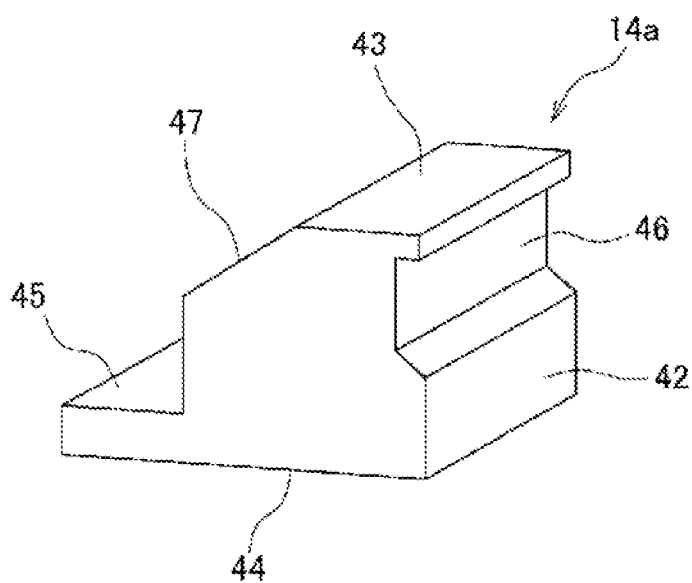
FIG. 3 is a perspective view of a fixing piece shown as an example.
Figure 4:
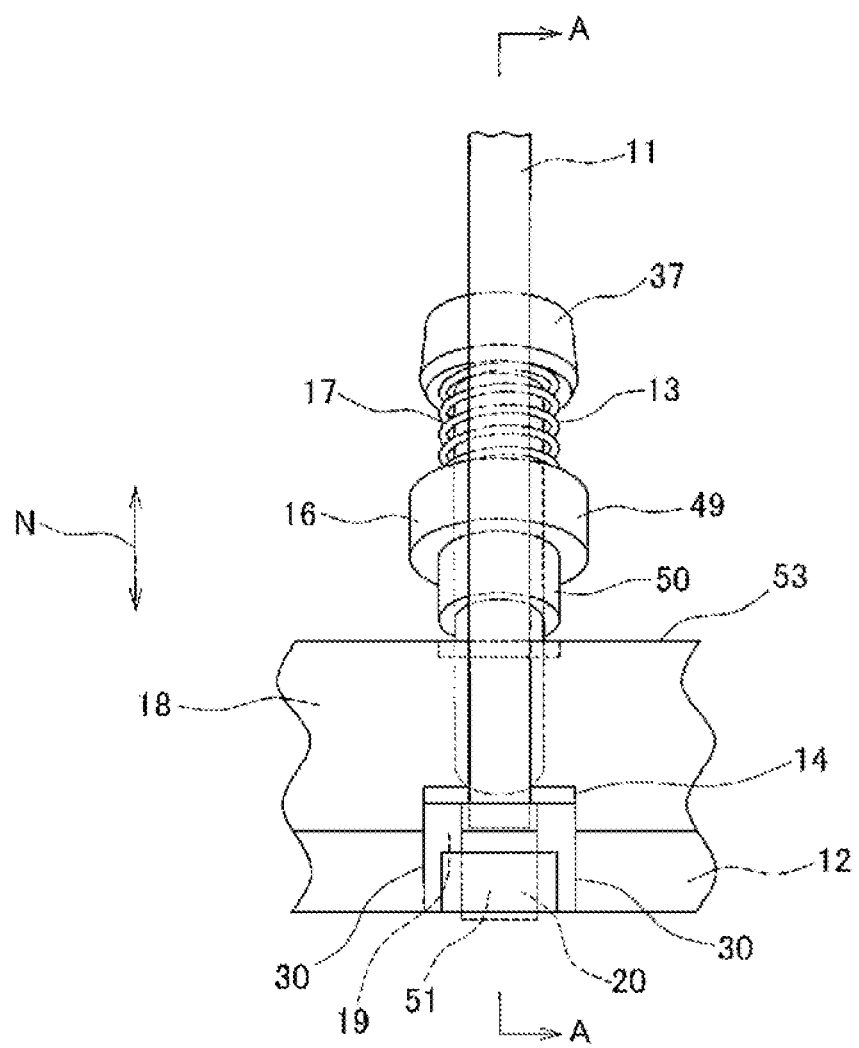
FIG. 4 is a partially enlarged front view of the optical fiber ferrule polishing jig when a pivoting rod is pivoted in an incline state.
Figure 5:
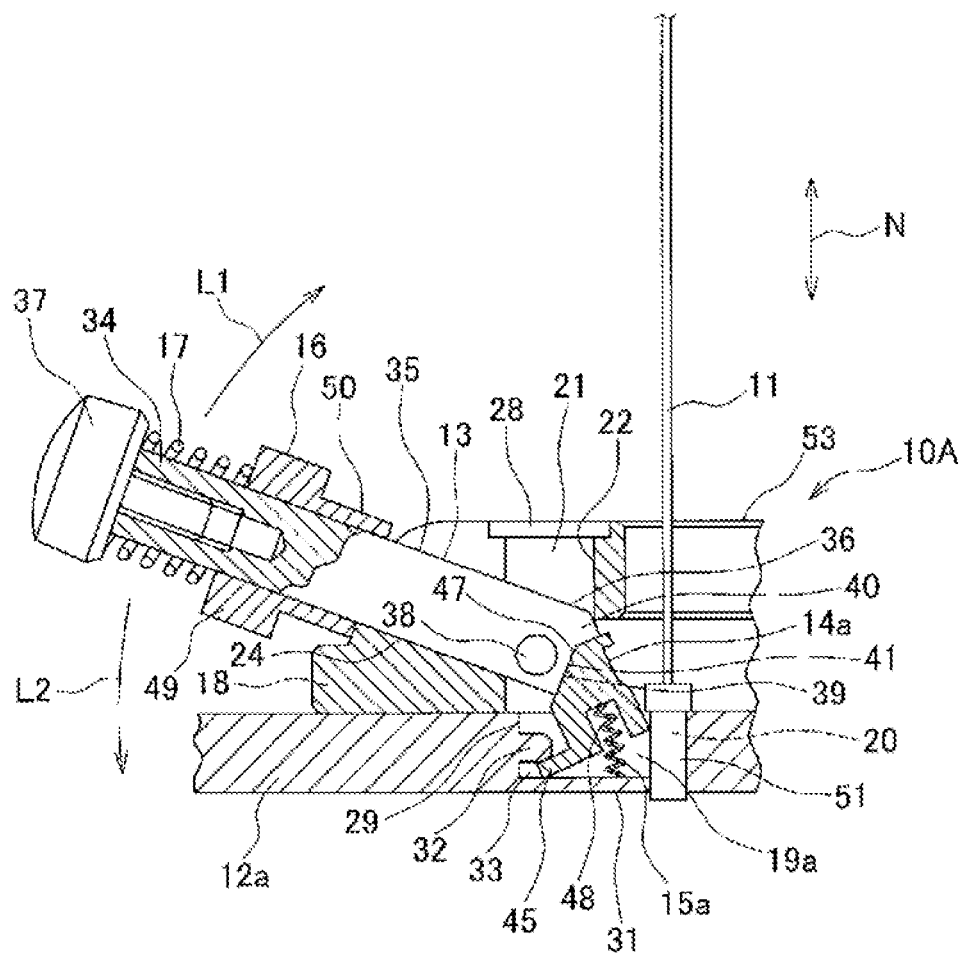
FIG. 5 is a cross-sectional view taken along line A-A in FIG. 4.
Figure 6:
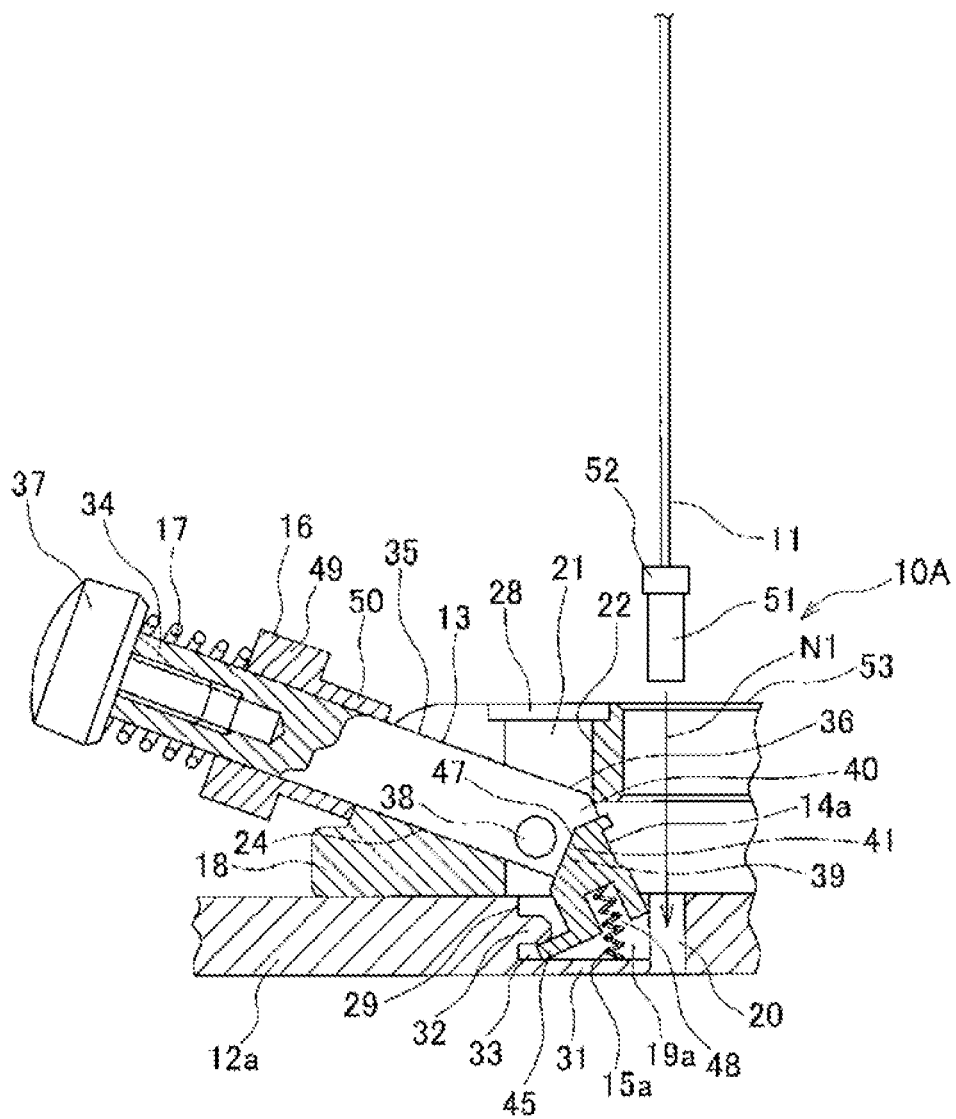
FIG. 6 is a cross-sectional view which is the same as FIG. 5 except that an optical fiber ferrule is not inserted into a ferrule insertion hole of a base.

The optical fiber ferrule polishing jig according to the present invention will be described in detail with reference to the accompanying drawings of FIG. 1 and the like. FIG. 1 is a top view of an optical fiber ferrule polishing jig 10A shown as an example. FIG. 2 is a partially enlarged perspective view showing a part of a raised portion 18. FIG. 3 is a perspective view of a fixing piece 14a shown as an example. FIG. 4 is a partially enlarged front view of the optical fiber ferrule polishing jig 10A when a pivoting rod 13 is pivoted in an incline state. FIG. 5 is a cross-sectional view taken along line A-A in FIG. 4. FIG. 6 is a cross-sectional view which is the same as FIG. 5 except that an optical fiber ferrule 51 is not inserted into a ferrule insertion hole 20 of a base 12a. In FIGS. 1, 4 and 5, an inward radial direction (a first direction) is indicated by an arrow L1, an outward radial direction (a second direction opposite to the first direction) is indicated by an arrow L2, a circumference direction is indicated by an arrow M and a vertical direction is indicated by an arrow N.

The optical fiber ferrule polishing jig 10A is installed in a ferrule polishing machine (not shown) and used for polishing the optical fiber ferrules 11 by the optical fiber ferrule polishing machine. The optical fiber ferrule polishing jig 10A has: a base 12a having a predetermined area and a predetermined thickness; a raised portion 18 formed into a flat-convex shape (plano-convex shape) with a predetermined thickness so as to be convex towards an upper side of the base 12a; a plurality of pivoting rods 13 rotatably installed in the base 12a; a plurality of fixing pieces 14a movably (rotatably) installed to the base 12a; a plurality of coil springs 15a (biasing units) installed in the base 12a and extending vertically; a plurality of slide locks 16 inserted around the pivoting rods 13; and a plurality of coil springs 17 inserted around the pivoting rods 13 and extending in the axial direction of the rod 13.

The base 12a (plate) is made of metal such as aluminum and alloy steel and formed into a quadrangular flat plate shape. The base 12a is detachably installed in the optical fiber ferrule polishing machine. A plurality of installation recesses 19a (installation portion) recessed downward and a plurality of insertion holes 20 vertically penetrating an upper surface and a lower surface of the base 12a are formed in the base 12a.

The raised portion 18 is made of metal such as aluminum and alloy steel or synthetic resin. The raised portion 18 is located on an upper side of the base 12a and extends annularly to form a torus (ring) shape. As shown in FIG. 2, the raised portion 18 has circularly arranged upper openings 21, circularly arranged upright support portions 22, circularly arranged side openings 23, circularly arranged inclined support portions 24, circularly arranged pivot-openings 25 and circularly arranged pivoting portions 26. At the bottom of the upright support portions 22 of the raised portion 18, a pair of cylindrical shaft holes 27 is perforated. A later described pair of shaft 38 of the pivoting rod 13 is rotatably installed in the shaft holes 27.

The upper opening 21 of the raised portion 18 is formed into a circular shape and open toward an upper side of the raised portion 18. In the upper opening 21, the pivoting rod 13 is located in an upright state. The upright support portion 22 surrounds the upper opening 21 and supports a later described intermediate portion 35 of the pivoting rod 13 so as to support the rod 13 in the upright state. A lock hole 28 recessed downward is formed in the upright support portion 22. The diameter of the lock hole 28 is slightly larger than the diameter of the upper opening 21. A later described lower end portion 50 of the slide lock 16 enters the lock hole 28 when the pivoting rod 13 is in the upright state.

The side opening 23 of the raised portion 18 is formed into a circular shape, and open toward the side of the raised portion 18 (outward radial direction (second direction)). In the side opening 23, pivoting rod 13 is located in an inclined state. The inclined support portion 24 surrounds the side opening 23 to support the pivoting rod 13 in the inclined state. The pivot-openings 25 communicates with the upper opening 21 and the side opening 23. The pivot-openings 25 is inclined from the upper opening 21 to the side opening 23 so as to form an arc shape. In the pivot-opening 25, the pivoting rod 13 pivots inward radial direction (first direction) and outward radial direction (second direction). The pivoting portion 26 surrounds the pivot-opening 25. The pivoting portion 26 communicates with the upright support portion 22 and the inclined support portion 24. The pivoting portion 26 is inclined from the upright support portion 22 to the inclined support portion 24 so as to form an arc shape.

The installation recess 19a (installation portion) is formed between the insertion hole 20 of the base 12a and the pivoting rod 13, and adjacent to the inward radial direction (first direction) of the upright support portion 22 of the raised portion 18 and located in the immediate vicinity of the raised portion 18. The installation recesses 19a are circularly arranged along the raised portion 18. The installation recess 19a has: a rear wall 29 located substantially right below the pivoting rod 13 and extending vertically; side walls 30 (both side surfaces) located on both sides of the rear wall 29 and extending vertically; and a bottom wall 31 extending in the radial direction.

In the rear wall 29 of the installation recess 19a, a shaft locking protrusion 32 extending inward radial direction (first direction) and a shaft hole 33 located between the bottom wall 29 and the shaft locking protrusion 32 and extending outward radial direction (second direction) are formed. In the installation recess 19a, the fixing piece 14a is movably (rotatably) installed.

The insertion hole 20 is adjacent to the inward radial direction (first direction) of the installation recess 19a and located in the immediate vicinity of the installation recess 19a. The insertion holes 20 are circularly arranged along the raised portion 18. The optical fiber ferrule 51 can be detachably inserted with respect to the insertion holes 20. The installation recess 19a may be located between the insertion hole 20 of the base 12a and the pivoting rod 13 and may be adjacent to the outward radial direction (second direction) of the upright support portion 22 of the raised portion 18. Namely, the insertion hole 20 may be adjacent to the outward radial direction (second direction) of the installation recess 19a.

The pivoting rods 13 are made of metal such as aluminum and alloy steel or synthetic resin and formed into a columnar shape which is long in the vertical direction. The pivoting rods 13 are circularly arranged along the raised portion 18. The pivoting rod 13 has: an upper end portion 34; a lower end portion 36; and an intermediate portion 35 located between the upper end portion 34 and the lower end portion 36. The pivoting rods 13 are adjacent to the outward radial direction (second direction) of the installation recess 19a of the base 12a. The pivoting rod 13 is located in the immediate vicinity of the installation recess 19a and the insertion hole 20 and rotatably inserted into the upper opening 21, the pivot-opening 25 and the side opening 23 of the raised portion 18. In the upper end portion 34 of the pivoting rod 13, a knob 37, which is gripped when the rod 13 is pivoted, is attached.

In the lower end portion 36 of the pivoting rod 13, a pair of cylindrical shafts 38 extending toward a circumference direction (laterally) is formed. In a bottom end 39, which has a cross-sectional circular shape, of the pivoting rod 13, a pressing protrusion 40 convex toward the fixing piece 14a is formed, as well as a remaining surface 41 except for the pressing protrusion 40 is defined and formed. The shafts 38 are rotatably inserted into the shaft hole 27 perforated at the bottom of the upright support portion 22 of the raised portion 18.

The pivoting rod 13 is rotatable inward radial direction (first direction) in the pivot-opening 25 of the raised portion 18 around the lower end portion 36 (shaft 38) so as to be in the upright state from the inclined state. The pivoting rod 13 is also rotatable outward radial direction (second direction) in the pivot-opening 25 of the raised portion 18 around the lower end portion 36 (shaft 38) so as to be in the inclined state from the upright state. The pressing protrusion 40 of the pivoting rod 13 abuts with a later described top portion 43 (inclined surface 47) of the fixing piece 14a and presses the fixing piece 14a inward radial direction (first direction) as the rod 13 is pivoted inward radial direction (first direction).

The fixing pieces 14a are movably (rotatably) installed (housed) in the installation recesses 19a of the base 12a. The fixing pieces 14a are circularly arranged along the raised portion 18. As shown in FIG. 3, the fixing piece 14a has: a front portion 42 facing the insertion hole 20 of the base 12a; a top portion 43 facing the bottom end 39 of the pivoting rod 13; a bottom portion 44 facing the bottom wall 31 of the installation recess 19a of the base 12a; and a moving shaft 45 (pivot plate) extending from the bottom portion 44 to the outward radial direction (second direction). The moving shaft 45 is inserted (disposed) into the shaft hole 33 formed in the installation recess 19a of the base 12a.

In the front portion 42 of the fixing piece 14a, an engagement portion 46 (recessed portion) recessed outward radial direction (second direction) (backward) is formed. A top portion 52 of the optical fiber ferrule 51 fits in the engagement portion 46. The top portion 43 of the fixing piece 14a has an inclined surface 47 that is gradually inclined downwardly from the front portion 42 toward a radially outward direction (backward). The pressing protrusion 40 of the pivoting rod 13 abuts with the inclined surface 47.

In the middle of the bottom portion 44 of the fixing piece 14a, a spring installation hole 48 extending vertically is perforated (formed). The fixing piece 14a is moved inward radial direction (first direction) around the moving shaft 45 in the installation recess 19a as the pivoting rod 13 pivots inward radial direction (first direction) to fix the optical fiber ferrule 51 with respect to the insertion hole 20. The fixing piece 14a is moved outward radial direction (second direction) around the moving shaft 45 in the installation recess 19a as the pivoting rod 13 is pivoted outward radial direction (second direction) to release fixing of the optical fiber ferrule 51 from the insertion hole 20.

Coil spring 15a is installed in each installation recess 19a of the base 12a and housed in the spring installation hole 48 formed at the bottom portion 44 of the fixing piece 14a in a compressed state. The coil spring 15a biases each fixing piece 14a (applies a force to each fixing piece 14a) upward and outward radial direction (second direction) so as to release fixing of the optical fiber ferrule 51 from the insertion hole 20. The fixing piece 14a is moved (pivoted) outward radial direction (second direction) by the biasing force. It is to be noted that a flat spring can also be used instead of the coil spring 15a. The flat spring is installed between installation recess 19a of the base 12a and the bottom portion 44 of the fixing piece 14a. The fixing piece 14a is biased outward radial direction (second direction) by the biasing force and the fixing piece 14a is moved outward radial direction (second direction).

The slide lock 16 is formed into a cylindrical shape and slid in an axial direction of the rod 13 in a state of being inserted around the pivoting rod 13. The slide lock 16 has: a cylindrical knob portion 49 which is gripped when the slide lock 16 is slid; and a cylindrical lower end portion 50 continued just below the knob portion 49. The diameter of the lower end portion 50 of the slide lock 16 is smaller than the diameter of the knob portion 49, slightly smaller than the diameter of the lock hole 28 of the upright support portion 22, and slightly larger than the diameter of the upper opening 21, the side opening 23, and the pivot-opening 25 of the raised portion 18.

The diameter of the knob portion 49 of the slide lock 16 is larger than the diameter of the upper opening 21, the side opening 23, and the pivot-opening 25 of the raised portion 18. The coil spring 17 is located between the upper end portion 34 (knob 37) of the pivoting rod 13 and the knob portion 49 of the slide lock 16 and extends in the axial direction of the rod 13. The coil spring 17 biases the slide lock 16 (applies a force to the slide lock 16) toward the bottom end 39 (downward) of the pivoting rod 13 by the biasing force.

As shown in FIGS. 4 to 6, in a state where the pivoting rod 13 is pivoted outward radial direction (second direction) and the rod 13 is in the inclined state, the pressing force of the pressing protrusion 40 of the rod 13 does not act on the inclined surface 47 of the top portion 43 of the fixing piece 14a, and the fixing piece 14a is moved outward radial direction (second direction) around the moving shaft 45 by the biasing force of the coil spring 15a. The front portion 42 and the top portion 43 of the fixing piece 14a are moved outward radial direction (second direction). The front portion 42 and the top portion 43 are spaced away outward radial direction (second direction) from the insertion hole 20. Thus, the insertion hole 20 of the base 12a is opened.

The pivoting rod 13 is located in the side opening 23 of the raised portion 18 and supported in the inclined state by the inclined support portion 24 of the raised portion 18. The slide lock 16 is slid toward the upper end portion 34 (knob 37) of the pivoting rod 13 by resisting the biasing force of the coil spring 17, and the lower end portion 50 of the slide lock 16 rides on the inclined support portion 24.

When the pivoting rod 13 is supported in the inclined state by the inclined support portion 24 (when the pivoting rod 13 pivots in the inclined state), the whole area of the remaining surface 41 of the bottom end 39 of the rod 13 abuts with the whole area of the inclined surface 47 of the top portion 43 of the fixing piece 14a. According to the optical fiber ferrule polishing jig 10A, when the pivoting rod 13 is pivoted to the inclined state, the whole area of the remaining surface 41 except for pressing protrusion 40 of the bottom end 39 of the rod 13 abuts with the whole area of the inclined surface 47 of the fixing piece 14a. Therefore, it is possible to prevent the fixing piece 14a from being further moved outward radial direction (second direction) by the rod 13 and it is possible to regulate the moving range of the fixing piece 14a outward radial direction (second direction).

According to the optical fiber ferrule polishing jig 10A, as shown by the arrow N1 in FIG. 6, the optical fiber ferrule 51 is inserted toward the opened insertion hole 20, and the optical fiber ferrule 51 is put into the insertion hole 20 as shown in FIG. 5. According to the optical fiber ferrule polishing jig 10A, the lower end portion 50 of the slide lock 16 rides on the inclined support portion 24 by resisting the biasing force of the coil spring 17, and the lower end portion 50 is pushed to the inclined support portion 24 by the biasing force of the coil spring 17. Since the pivoting rod 13 is supported in the inclined state by the inclined support portion 24 of the raised portion 18, the pivoting rod 13 is not carelessly moved (pivoted) inward radial direction (first direction), and the released state of the fixing piece 14a with respect to the insertion hole 20 can be maintained and at the same time, the open state of the insertion hole 20 can be maintained. Thus, it is possible to smoothly insert the optical fiber ferrule 51 into the insertion hole 20.

According to the optical fiber ferrule polishing jig 10A (including a later described optical fiber ferrule polishing jig 10B), a placing member 53 is formed by the raised portion 18 extending annularly to form a torus shape (ring shape) and a plurality of pivoting rods 13 circularly arranged along the raised portion 18. The placing member 53 is detachably installed on the upper surface of the base 12a. As already described, the raised portion 18 forming the placing member 53 has: circularly arranged upper openings 21; circularly arranged upright support portions 22; circularly arranged side openings 23; circularly arranged inclined support portions 24; circularly arranged pivot-openings 25; and circularly arranged pivoting portions 26. In the placing member 53, the raised portion 18 extends annularly to form a torus shape (ring shape), but the raised portion 18 may be formed into a linearly extending shape and a plurality of raised portions 18 may be arranged in line.

As already described, the pivoting rod 13 forming the placing member 53 has: the upper end portion 34; the lower end portion 36; and the intermediate portion 35, and the pivoting rod 13 is rotatably inserted into the upper opening 21, the pivot-opening 25, and the side opening 23 of the raised portion 18. In the pivoting rod 13, the shaft 38 formed in the lower end portion 36 is rotatably inserted into the shaft hole 27, which is perforated at the bottom of the upright support portion 22 of the raised portion 18. Thus, the pivoting rod 13 can rotate inward radial direction (first direction) and outward radial direction (second direction) around the lower end portion 36. At the bottom end 39 of a cross-sectional circular shape of the pivoting rod 13, the pressing protrusion 40, which is convex toward the fixing piece 14a, is formed and the remaining surface 41 except for pressing protrusion 40 is defined and formed.

According to the placing member 53, the pivoting rod 13 rotatably installed into the raised portion 18 is used to fix the optical fiber ferrule 51 to the base 12a of the optical fiber ferrule polishing jig 10A. Therefore, the optical fiber ferrule 51 can be fixed with respect to the insertion hole 20 of the base 12a only by pivoting the pivoting rod 13 in the raised portion 18. At the same time, the optical fiber ferrule 51 can be released from the fixing in the insertion hole 20 of the base 12a only by pivoting the pivoting rod 13 in the raised portion 18. Thus, it is possible to fix and release the optical fiber ferrule 51 in the insertion hole 20 of the base 12a only by the pivot operation of the pivoting rod 13 without requiring labor and time.

Figure 7:
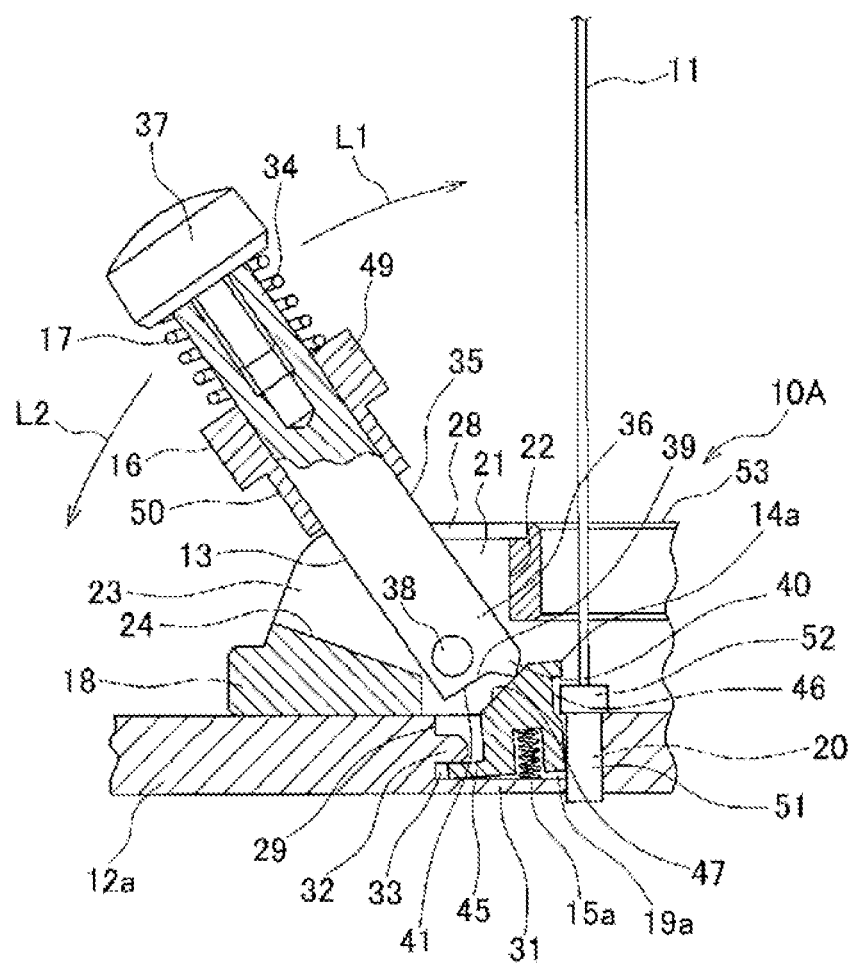
FIG. 7 is a cross-sectional view which is the same as FIG. 5 showing the pivoting rod in a half-pivoted state.
Figure 8:
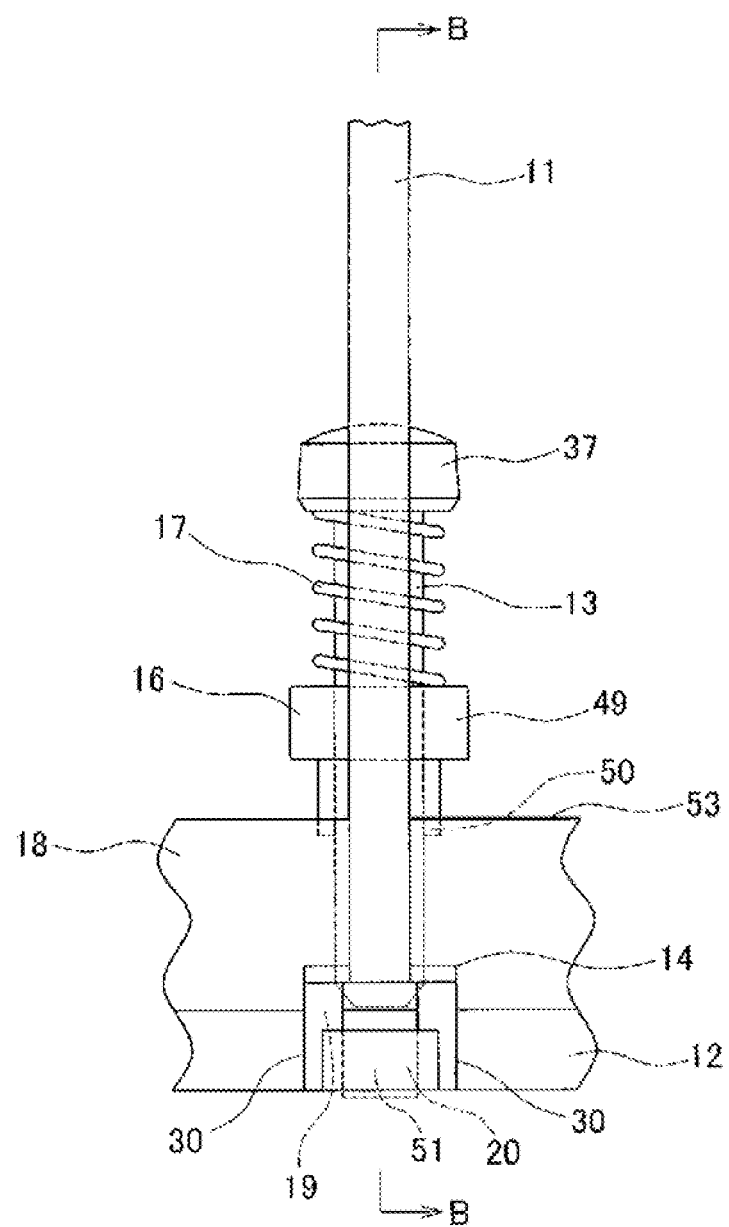
FIG. 8 is a partially enlarged front view of the optical fiber ferrule polishing jig when the pivoting rod is pivoted to an upright state.
Figure 9:
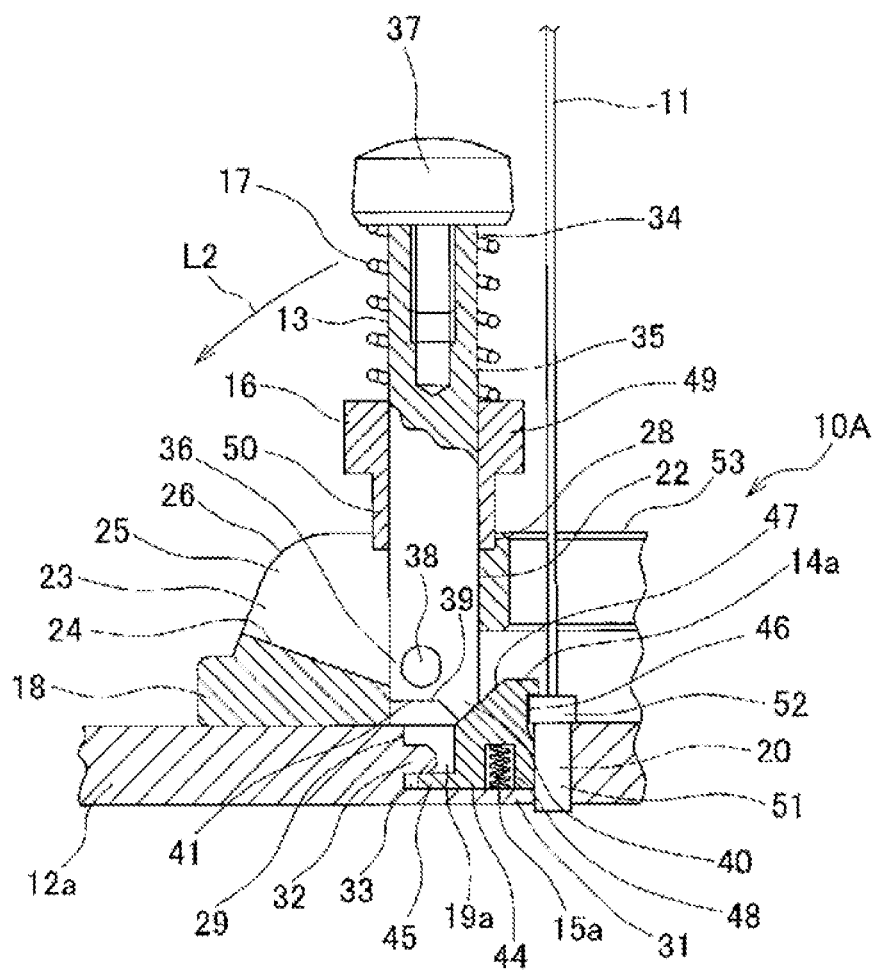
FIG. 9 is a cross-sectional view taken along line B-B in FIG. 8.

FIG. 7 is a cross-sectional view showing the pivoting rod 13 in the half-pivoted state. FIG. 8 is a partially enlarged front view of the optical fiber ferrule polishing jig 10A when the pivoting rod 13 is pivoted to the upright state. FIG. 9 is a cross-sectional view taken along the line B-B in FIG. 8. In FIG. 7, the inward radial direction (first direction) is indicated by the arrow L1, the outward radial direction (second direction) is indicated by the arrow L2. In FIG. 9, the outward radial direction (second direction) is indicated by the arrow L2.

The procedure to fix the optical fiber ferrule 51 to the optical fiber ferrule polishing jig 10A will be described below. After the optical fiber ferrule 51 is inserted into the insertion hole 20 of the open state in the base 12a, the knob 37 of the pivoting rod 13 is gripped and the pivoting rod 13 of the inclined state is pivoted inward radial direction (first direction) as shown by the arrow L1 in FIG. 5.

When the pivoting rod 13 is pivoted inward radial direction (first direction), the rod 13 is pivoted from the side opening 23 toward the upper opening 21 of the raised portion 18 around the lower end portion 36, and the intermediate portion 35 of the rod 13 is moved in the pivot-opening 25 of the raised portion 18 as shown in FIG. 7. While the lower end portion 50 of the slide lock 16 rides on the pivoting portion 26 of the raised portion 18, the lower end portion 50 is slid on the pivoting portion 26 and the pivoting rod 13 is moved from the inclined support portion 24 toward the upright support portion 22 of the raised portion 18.

When the pivoting rod 13 is pivoted inward radial direction (first direction), the pressing protrusion 40 formed at the bottom end 39 of the rod 13 presses the inclined surface 47 of the top portion 43 of the fixing piece 14a, the fixing piece 14a is gradually moved inward radial direction (first direction) around the moving shaft 45 by resisting the biasing force of the coil spring 15a (biasing unit). Thus, the front portion 42 and the top portion 43 of the fixing piece 14a are moved inward radial direction (first direction) and the front portion 42 and the top portion 43 gradually approach the insertion hole 20.

According to the optical fiber ferrule polishing jig 10A, when the pivoting rod 13 is pivoted from the inclined state to the upright state, the pressing protrusion 40 of the rod 13 slides and presses the inclined surface 47 of the fixing piece 14a. Therefore, the fixing piece 14a can be smoothly moved inward radial direction (first direction) by resisting the biasing force of the coil spring 15. Thus, it is possible to surely move the fixing piece 14a inward in the radial direction (first direction) around the moving shaft 45 by the pressing protrusion 40 of the rod 13.

When the pivoting rod 13 is further pivoted inward radial direction (first direction) from the state shown in FIG. 7, the rod 13 is moved in the pivoting portion 26 toward the upper opening 21 of the raised portion 18. As shown in FIGS. 8 and 9, the rod 13 is moved from the pivoting portion 26 to the upright support portion 22, and the rod 13 is pivoted from the inclined state to the upright state. As the pivoting rod 13 is pivoted from the inclined state to the upright state, the fixing piece 14a is further moved inward radial direction (first direction) and the front portion 42 of the fixing piece 14a is moved to the insertion hole 20.

When the pivoting rod 13 is pivoted to the upright state, the rod 13 is located in the upper opening 21 of the raised portion 18 and the intermediate portion 35 of the rod 13 abuts with the upright support portion 22 of the raised portion 18. This prevents the rod 13 from being further pivoted inward radial direction (first direction). When the pivoting rod 13 is moved to the upright support portion 22 of the raised portion 18, the slide lock 16 is moved to the lower part of the rod 13 by the biasing force of the coil spring 17 and the lower end portion 50 of the slide lock 16 enters the lock hole 28.

When the lower end portion 50 of the slide lock 16 enters the lock hole 28, the pivoting rod 13 is fixed to the upright support portion 22 so as not to be pivoted, and the upright state of the rod 13 is maintained. Further, the slide lock 16 is pressed toward the lower part of the pivoting rod 13 by the biasing force of the coil spring 17, and the entered state of the lower end portion 50 of the slide lock 16 with respect to the lock hole 28 is maintained.

When the pivoting rod 13 is in the upright state in the raised portion 18 and the front portion 42 of the fixing piece 14a is moved in the insertion hole 20, a whole area of the bottom portion 44 of the fixing piece 14a abuts with the bottom wall 31 of the installation recess 19a as shown in FIG. 9. At the same time, the top portion 52 of the optical fiber ferrule 51 fits in the engagement portion 46 of the front portion 42 of the fixing piece 14a. Since the top portion 52 of the optical fiber ferrule 51 fits in the engagement portion 46, the optical fiber ferrule 51 is fixed so as not to be moved freely with respect to the insertion hole 20 of the base 12a, and the optical fiber ferrule 51 is fixed so as not to be escaped from the insertion hole 2.

According to the optical fiber ferrule polishing jig 10A, the entered state of the lower end portion 50 of the slide lock 16 with respect to the lock hole 28 is maintained by the biasing force of the coil spring 17, and the upright state of the pivoting rod 13 is maintained. Therefore, the rod 13 is not carelessly pivoted outward radial direction (second direction), and the fixing of the optical fiber ferrule 51 to the insertion hole 20 is not carelessly released. Thus, it is possible to maintain the fixing of the optical fiber ferrule 51 by the fixing piece 14a with respect to the insertion hole 20.

According to the optical fiber ferrule polishing jig 10A, when the pivoting rod 13 is pivoted to the upright state, the top portion 52 of the optical fiber ferrule 51 fits in the engagement portion 46 formed in the front portion 42 of the fixing piece 14a. Therefore, the optical fiber ferrule 51 can be fixed to the insertion hole 20 so as not to be moved freely by the engagement portion 46 of the fixing piece 14a, and the optical fiber ferrule 51 can be fixed so as not to be escaped from the insertion hole 20.

The procedure to remove the optical fiber ferrule 51 from the insertion hole 20 will be described below. First, the knob portion 49 of the slide lock 16, which is inserted around the pivoting rod 13 and in the upright state, is gripped and the slide lock 16 is moved toward the upper end portion 34 of the rod 13 by resisting the biasing force of the coil spring 17. Thus, the lower end portion 50 of the slide lock 16 is pulled out from the lock hole 28. Next, the knob 37 of the pivoting rod 13 is gripped while the knob portion 49 is gripped, and the pivoting rod 13 which is in the upright state is pivoted outward radial direction (second direction) as shown by the arrow L2 in FIG. 9.

When the pivoting rod 13 is pivoted outward radial direction (second direction), the rod 13 is pivoted from the upper opening 21 of the raised portion 18 toward the side opening 23 around the lower end portion 36. Thus, the upper end portion 34 and the intermediate portion 35 of the rod 13 are moved in the pivot-opening 25 of the raised portion 18. While the lower end portion 50 of the slide lock 16 rides on the pivoting portion 26 of the raised portion 18, the lower end portion 50 is slid on the pivoting portion 26 and the pivoting rod 13 is moved from the upright support portion 22 toward the inclined support portion 24 of the raised portion 18.

When the pivoting rod 13 is pivoted outward radial direction (second direction), the pressing protrusion 40 formed at the bottom end 39 of the rod 13 is moved upward on the inclined surface 47 of the top portion 43 of the fixing piece 14a, the fixing piece 14a is gradually moved outward radial direction (second direction) around the moving shaft 45 by the biasing force of the coil spring 15a (biasing unit), and the front portion 42 and the top portion 43 of the fixing piece 14a are moved outward radial direction (second direction). Thus, the front portion 42 and the top portion 43 are gradually spaced away from the insertion hole 20 (shown in FIG. 7).

When the pivoting rod 13 is further pivoted outward radial direction (second direction), the rod 13 is moved toward the side opening 23 of the raised portion 18 in the pivoting portion 26 and the rod 13 is moved from the pivoting portion 26 to the inclined support portion 24, and the rod 13 is pivoted from the upright state to the inclined state. As the pivoting rod 13 is pivoted from the upright state to the inclined state, the fixing piece 14a is further moved outward radial direction (second direction) and the front portion 42 of the fixing piece 14a is spaced away from the insertion hole 20.

When the pivoting rod 13 is pivoted to the inclined state, the rod 13 is located in the side opening 23 of the raised portion 18 and the intermediate portion 35 of the rod 13 abuts with the inclined support portion 24 of the raised portion 18. Therefore, the rod 13 is prevented from being further pivoted outward radial direction (second direction). When the pivoting rod 13 is moved to the inclined support portion 24 of the raised portion 18, the bottom portion 44 of the fixing piece 14a is spaced away upward from the bottom wall 31 of the installation recess 19a and the engagement portion 46 of the front portion 42 of the fixing piece 14a is spaced away outward radial direction (second direction) from the top portion 52 of the optical fiber ferrule 51. Thus, the fixing of the optical fiber ferrule 51 to the insertion hole 20 of the base 12a is released (shown in FIG. 5).

After the fixing of the optical fiber ferrule 51 with respect to the insertion hole 20 is released, the optical fiber ferrule 51 is removed from the insertion hole. According to the optical fiber ferrule polishing jig 10A, the moved state of the fixing piece 14a is maintained by the biasing force of the coil spring 15a, and the open state of the insertion hole 20 is maintained. Therefore, it is possible to smoothly insert the optical fiber ferrules 51 to the insertion holes 20 and it is possible to smoothly remove the optical fiber ferrules 51 from the insertion holes 20.

According to the optical fiber ferrule polishing jig 10A, as the pivoting rod 13 is pivoted (pivoted inward radial direction (first direction)) from the inclined state to the upright state, the fixing piece 14a is moved inward radial direction (first direction) by resisting the biasing force of the coil spring 15a (biasing unit), and the top portion 52 of the optical fiber ferrule 51 fits in the engagement portion 46 formed in the front portion 42 of the fixing piece 14a. Therefore, the optical fiber ferrule 51 is fixed to the insertion hole 20 so as not to be moved freely by the engagement portion 46 of the fixing piece 14a and the optical fiber ferrule 51 is fixed so as not to be escaped from the insertion hole 20. Thus, the optical fiber ferrule 51 can be fixed with respect to the insertion hole 20 only by the operation of pivoting the rod 13 inward radial direction (first direction) and it is possible to simply and easily fix the optical fiber ferrule 51 with respect to the insertion hole 20 without requiring labor and time for fixing the optical fiber ferrule 51 to the insertion hole 20.

According to the optical fiber ferrule polishing jig 10A, as the pivoting rod 13 is pivoted from the upright state to the inclined state (pivoted outward radial direction (second direction)), the fixing piece 14a is moved outward radial direction (second direction) by the biasing force of the coil spring 15a (biasing unit) and the engagement portion 46 of the fixing piece 14a is disengaged from the top portion 52 of the optical fiber ferrule 51. Thus, the fixing of the optical fiber ferrule 51 by the fixing piece 14a is released. Therefore, the fixing of the optical fiber ferrule 51 with respect to the insertion hole 20 by fixing piece 14a can be released only by the operation of pivoting the rod 13 outward radial direction (second direction). Thus, it is possible to simply and easily release fixing of the optical fiber ferrule 51 with respect to the insertion hole 20 without requiring labor and time for releasing the fixing of the optical fiber ferrule 51 from the insertion hole 20.

According to the optical fiber ferrule polishing jig 10A, the optical fiber ferrule 51 can be fixed to each insertion hole 20 so as not to be moved freely by the engagement portion 46 of the fixing piece 14a and the optical fiber ferrule 51 can be fixed so as not to be escaped from the insertion hole 20. Therefore, the fixing condition of each optical fiber ferrule 51 with respect to each insertion hole 20 can be the same in all of optical fiber ferrules 51, and it is possible to uniformly perform polishing the optical fiber ferrules 51.

Figure 10:
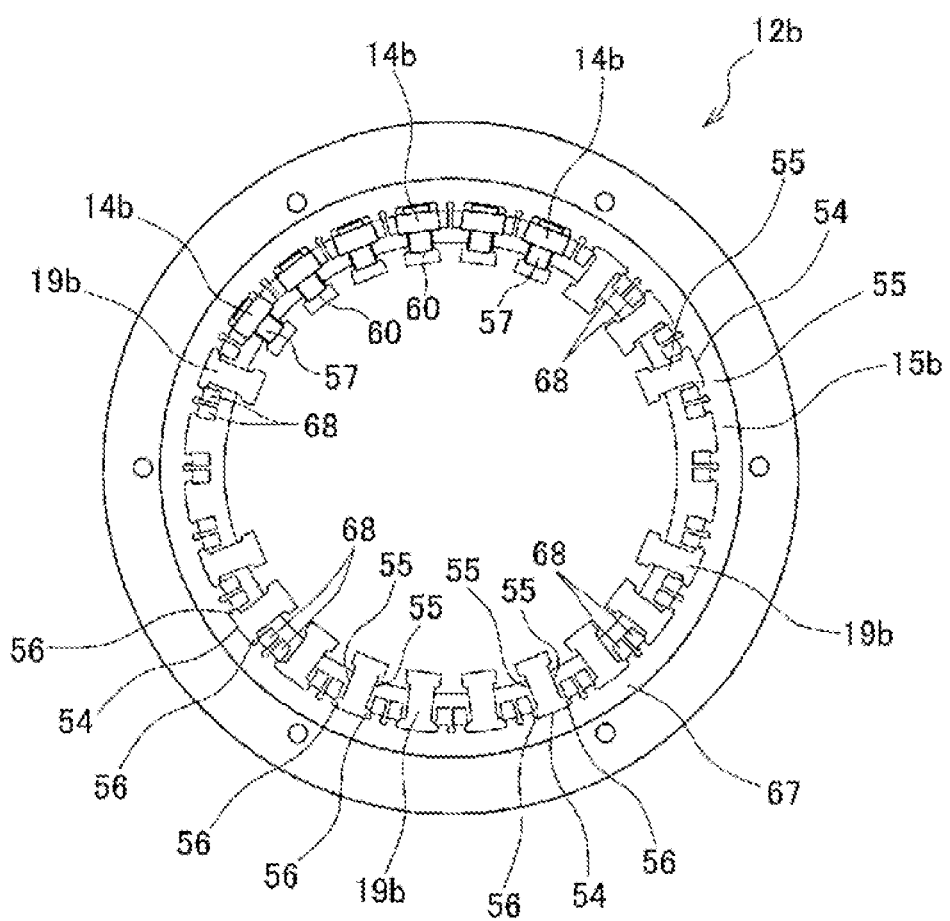
FIG. 10 is a top view of the base shown as another example.
Figure 11:
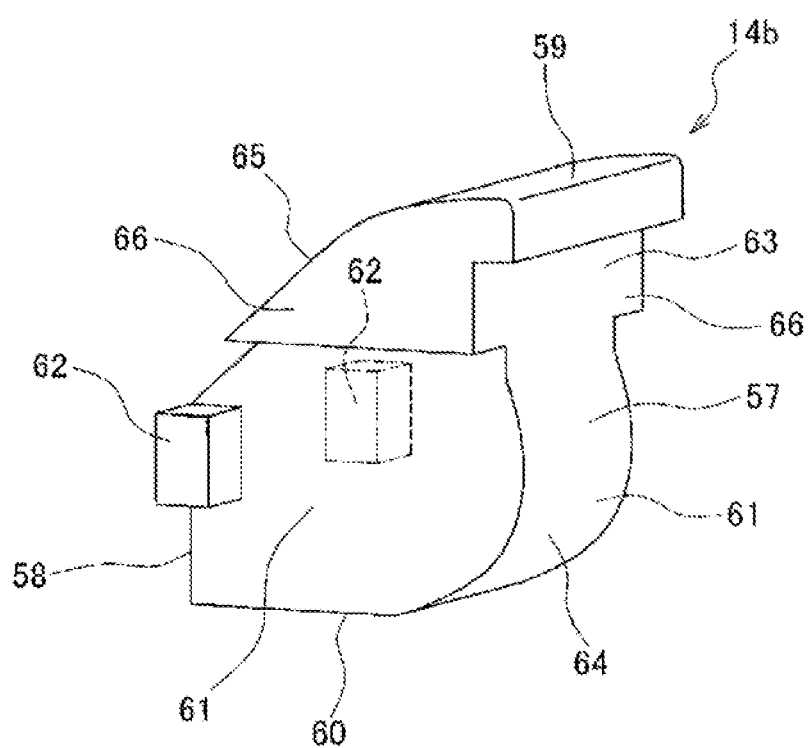
FIG. 11 is a perspective view of the fixing piece shown as another example.
Figure 12:
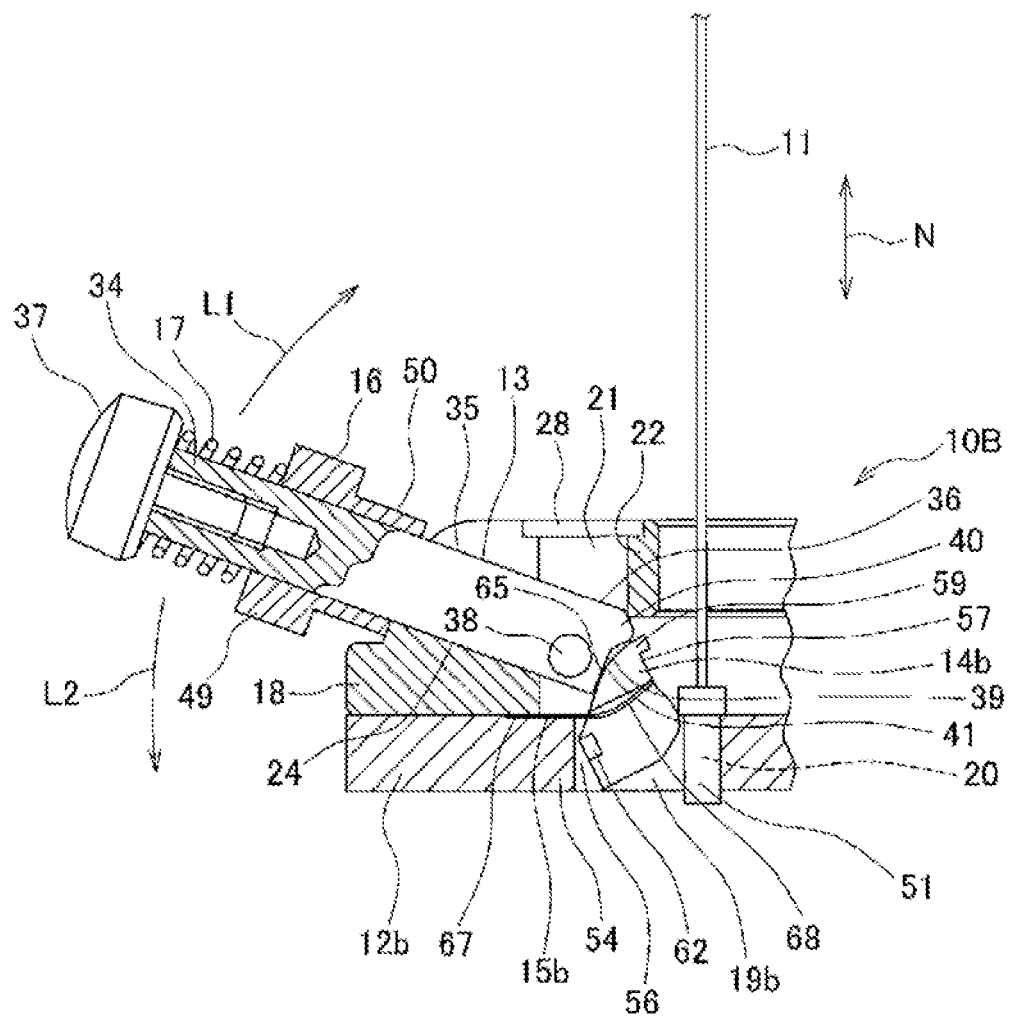
FIG. 12 is a cross-sectional view of the optical fiber ferrule polishing jig which is similar to FIG. 5 and shown as another example.
Figure 13:
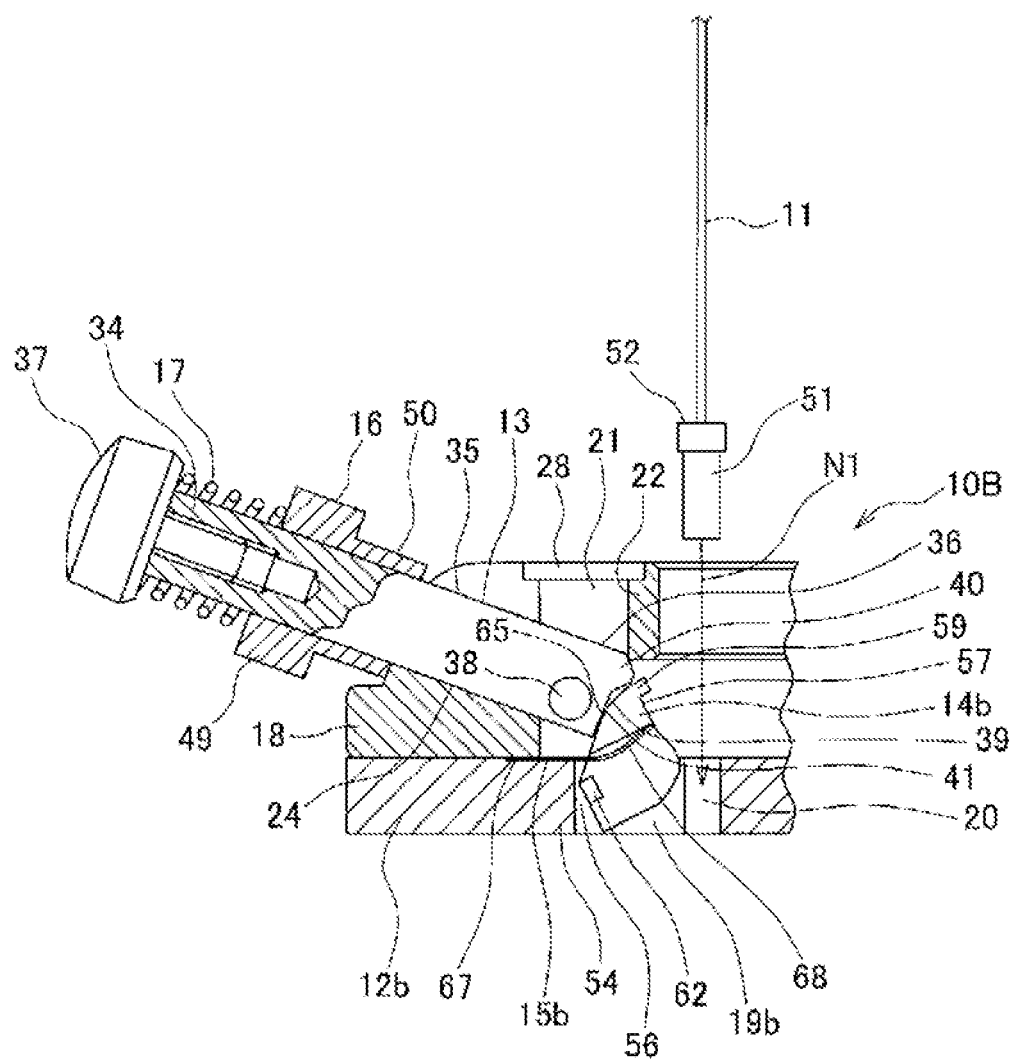
FIG. 13 is a cross-sectional view which is the same as FIG. 12 except that the optical fiber ferrule is not inserted into the ferrule insertion hole of the base.

FIG. 10 is a top view of a base 12B shown as another example. FIG. 11 is a perspective view of the fixing piece 14b shown as another example. FIG. 12 is a cross-sectional view of the optical fiber ferrule polishing jig 10B which is similar to FIG. 5 and shown as another example. FIG. 13 is a cross-sectional view which is the same as FIG. 12 except that the optical fiber ferrule 51 is not inserted into the ferrule insertion hole 20 of the base 12b. In FIG. 10, the flat spring 15b is disposed on the upper surface of the base 12b and the fixing pieces 14b are disposed in the six installation holes 19b among the installation holes 19b of the base 12b. In FIGS. 10 and 12, the inward radial direction (first direction) is indicated by an arrow L1, the outward radial direction (second direction opposite to the first direction) is indicated by an arrow L2, the circumference direction is indicated by an arrow M, and the vertical direction is indicated by an arrow N. It is to be noted that the top view of the optical fiber ferrule polishing jig 10B is the same as FIG. 1.

The optical fiber ferrule polishing jig 10B is installed to the ferrule polishing machine (not shown) and used for polishing an optical fiber ferrule 11 by an optical fiber ferrule polishing machine, same as in the case of the optical fiber ferrule polishing jig 10A. The optical fiber ferrule polishing jig 10B has: the base 12b with a predetermined area and a predetermined thickness; the raised portion 18 with predetermined thickness formed into a flat-convex shape so as to be convex toward an upper side of the base 12b; a plurality of pivoting rods 13 rotatably installed to the base 12b; a plurality of fixing pieces 14b rotatably (movably) installed to the base 12b; the flat spring 15b (biasing unit) installed to the base 12b; a plurality of slide locks 16 inserted around the pivoting rods 13; and a plurality of coil springs 17 inserted around the pivoting rods 13 and extending in the axial direction of the rod 13.

The base 12b (plate) is made of metal such as aluminum and alloy steel and formed into a circular flat plate shape (disc shape). The base 12b is detachably installed to the optical fiber ferrule polishing machine. In the base 12b, a plurality of installation holes 19b (installation portion) vertically penetrating an upper surface and a lower surface of the base 12b and a plurality of insertion holes 20 vertically penetrating the upper surface and a lower surface of the base 12b are formed.

The raised portion 18 is the same as the raised portion of the optical fiber ferrule polishing jig 10A. The raised portion 18 extends annularly to form a torus shape (ring shape) and located on the upper surface of the base 12b. Each configuration of the raised portion 18 is the same as in the case of the optical fiber ferrule polishing jig 10A. Therefore, the explanation of the configuration of the raised portion 18 is omitted by applying the explanation of the raised portion 18 of the optical fiber ferrule polishing jig 10A and by assigning the same reference numerals as in the case of the optical fiber ferrule polishing jig 10A.

The installation hole 19b (installation portion) is formed between the insertion hole 20 of the base 12b and the pivoting rod 13. The installation hole 19b is adjacent to the inward radial direction (first direction) of the upright support portion 22 of the raised portion 18. The installation hole 19b is located in the immediate vicinity of the raised portion 18. The installation holes 19b are circularly arranged along the raised portion 18. In the installation hole 19b, the fixing piece 14b is rotatably (movably) installed.

The installation hole 19b has: a rear wall 54 extending vertically and located substantially right below the pivoting rod 13; side walls 55 (both side surfaces) extending vertically and located on both sides of the rear wall 54; and a pair of shaft holes 56 formed in the side walls 55 located on the side of the rear wall 54. The shaft hole 56 is a through hole vertically penetrating the upper surface and a lower surface of the base 12b, and shaft hole 56 extends from the side walls 55 to the circumference direction (horizontal direction).

The insertion holes 20 are adjacent to the inward radial direction (first direction) of the installation holes 19b, located in the immediate vicinity of the installation holes 19b, and circularly arranged along the raised portion 18. The pivoting rods 13 are annularly arranged along the raised portion 18. Each configuration of the insertion hole 20 and the pivoting rod 13 is the same as in the case of the optical fiber ferrule polishing jig 10A. Therefore, the explanation of the configuration of the insertion hole 20 and the pivoting rod 13 is omitted by applying the explanation of the insertion hole 20 and the pivoting rod 13 of the optical fiber ferrule polishing jig 10A, and by assigning the same reference numerals as in the case of the optical fiber ferrule polishing jig 10A.

The fixing pieces 14b are rotatably (movably) installed (housed) in the installation holes 19b of the base 12b, and circularly arranged along the raised portion 18. As shown in FIG. 11, the fixing piece 14b has: a front portion 57 facing the insertion hole 20 of the base 12b; a rear portion 58 facing the rear wall 54 of the installation hole 19b of the base 12b; a top portion 59 facing the bottom end 39 of the pivoting rod 13; a bottom portion 60 located at the bottom of the installation hole 19b of the base 12b; both side portions 61 facing side walls 30 (both side surfaces) of the installation hole 19b of the base 12b; and a pair of rotating shaft 62 (pivot shaft) extending in a circumference direction (laterally) from the both side portions 61 located on the side of the rear portion 58. The rotating shaft 62 is disposed in the shaft hole 56 formed in the installation hole 19b of the base 12b.

In the front portion 57 of the fixing piece 14b, an engagement portion 63 (recessed portion) recessed outward radial direction (second direction) (backward) is formed, and a curved surface 64 connected to the engagement portion 63 and curved toward the bottom portion 60 is formed. It is to be noted that an inclined surface connected to the engagement portion 63 and gradually inclined downwardly toward the bottom portion 60 (inclined toward the rear portion 58) can also be formed in the front portion 57 of the fixing piece 14b instead of the curved surface 64. The top portion 52 of the optical fiber ferrule 51 fits in the engagement portion 63.

The top portion 59 of the fixing piece 14b has an inclined surface 65 that is gradually inclined downwardly from the front portion 57 toward a radially outward direction (second direction) (backward). The pressing protrusion 40 of the pivoting rod 13 abuts with the inclined surface 65. In the both side portions 61 located on the top portion 59 side of the fixing pieces 14b, a pair of abutment portions 66 extending (projecting) in the circumference direction (laterally) from the both side portions 61 is formed.

As the pivoting rod 13 is pivoted inward radial direction (first direction), the fixing piece 14b is pivoted (moved) around the rotating shaft 62 inward radial direction (first direction) in the installation hole 19b and the optical fiber ferrule 51 is fixed to the insertion hole 20. As the pivoting rod 13 is pivoted outward radial direction (second direction), the fixing piece 14b is pivoted around the rotating shaft 62 outward radial direction (second direction) in the installation hole 19b, and the optical fiber ferrule 51 is released from the insertion hole 20.

The flat spring 15b is disposed near the area outward radial direction (second direction near) of each installation hole 19b of the base 12b. The flat spring 15b has: a base portion 67;

and a plurality of spring portions 68 connected to the base portion 67. The base portion 67 is located on the upper surface of the base 12b extending near outward radial direction of each installation hole 19b. The base portion 67 extends annularly along the raised portion 18 to form a toms shape (ring shape). The base portion 67 is interposed between the upper surface of the base 12b and the lower surface of the inclined support portion 24 of the raised portion 18 and fixed to the upper surface of the base 12b in a state of being sandwiched between the base 12b and the inclined support portion 24 of the raised portion 18.

The spring portions 68 are located on the upper surface of the base 12b extending between the adjacent installation holes 19b and circularly arranged along the raised portion 18. According to the optical fiber ferrule polishing jig 10B, when the fixing pieces 14b are installed (housed) in the installation holes 19b, the spring portions 68 are interposed between the upper surface of the base 12b, which extends between the adjacent installation holes 19b, and the abutment portions 66 of the both side portions 61 of the fixing piece 14b. Thus, the abutment portions 66 of the both side portions 61 of the fixing piece 14b abut with the spring portion 68 of the flat spring 15b. The spring portion 68 biases each fixing piece 14b upward and outward radial direction (second direction) so as to release fixing of the optical fiber ferrule 51 with respect to the insertion hole 20. By the biasing force, the fixing piece 14b is pivoted (moved) outward radial direction (second direction).

The slide lock 16 is slid in the axial direction of the rod 13 in the state of being inserted around the pivoting rod 13. A coil spring 17 biases the slide lock 16 toward the bottom end 39 of the pivoting rod 13 (downward) by the biasing force. Each configuration of the slide lock 16 and coil spring 17 is the same as the configuration of the optical fiber ferrule polishing jig 10A. Therefore, the explanation of configuration of the slide lock 16 and the coil spring 17 is omitted by applying the explanations of slide lock 16 and coil spring 17 of the optical fiber ferrule polishing jig 10A, and by assigning the same reference numerals as in the case of the optical fiber ferrule polishing jig 10A.

As shown in FIGS. 12 and 13, in a state where the pivoting rod 13 is pivoted outward radial direction (second direction) and the rod 13 is in the inclined state, the pressing force of pressing protrusion 40 of the rod 13 does not act on the inclined surface 65 of the top portion 59 of the fixing piece 14b, and the fixing piece 14b is pivoted (moved) around the rotating shaft 62 outward radial direction (second direction) by the biasing force of the spring portion 68 of the flat spring 15b. The front portion 57 and the top portion 59 of the fixing piece 14b are pivoted outward radial direction (second direction). The front portion 57 and the top portion 59 are spaced away outward radial direction (second direction) from the insertion hole 20 and the insertion hole 20 of the base 12b is opened.

The pivoting rod 13 is located in the side opening 23 of the raised portion 18 and supported in the inclined state by the inclined support portion 24 of the raised portion 18. The slide lock 16 is slid toward the upper end portion 34 of the pivoting rod 13 (knob 37) by resisting the biasing force of the coil spring 17, and the lower end portion 50 of the slide lock 16 rides on the inclined support portion 24. According to the optical fiber ferrule polishing jig 10B, when the pivoting rod 13 is pivoted to the inclined state, the pressing protrusion 40 of the bottom end 39 of the rod 13 abuts with the top portion 59 of the fixing piece 14b, the remaining surface 41 except for the pressing protrusion 40 abuts with the inclined surface 65 of the fixing piece 14b. Therefore, it is possible to prevent the fixing piece 14b from being further pivoted (moved) outward radial direction (second direction) by the rod 13, and it is possible to regulate the pivoting range of the fixing piece 14b outward radial direction (second direction).

According to the optical fiber ferrule polishing jig 10B, as shown by the arrow N1 in FIG. 13, the optical fiber ferrule 51 is inserted toward the opened insertion hole 20, and the optical fiber ferrule 51 is put into the insertion hole 20 as shown in FIG. 12. According to the optical fiber ferrule polishing jig 10B, the lower end portion 50 of the slide lock 16 rides on the inclined support portion 24 by resisting the biasing force of the coil spring 17, and the lower end portion 50 is pushed to the inclined support portion 24 by the biasing force of the coil spring 17, and the pivoting rod 13 is supported in the inclined state by the inclined support portion 24 of the raised portion 18. Therefore, the pivoting rod 13 is not carelessly pivoted (moved) inward radial direction (first direction) and the released state of the fixing piece 14b in the insertion hole 20 is maintained and at the same time, the open state of the insertion hole 20 is maintained. Thus, it is possible to smoothly insert the optical fiber ferrule 51 into the insertion hole 20.

Figure 14:
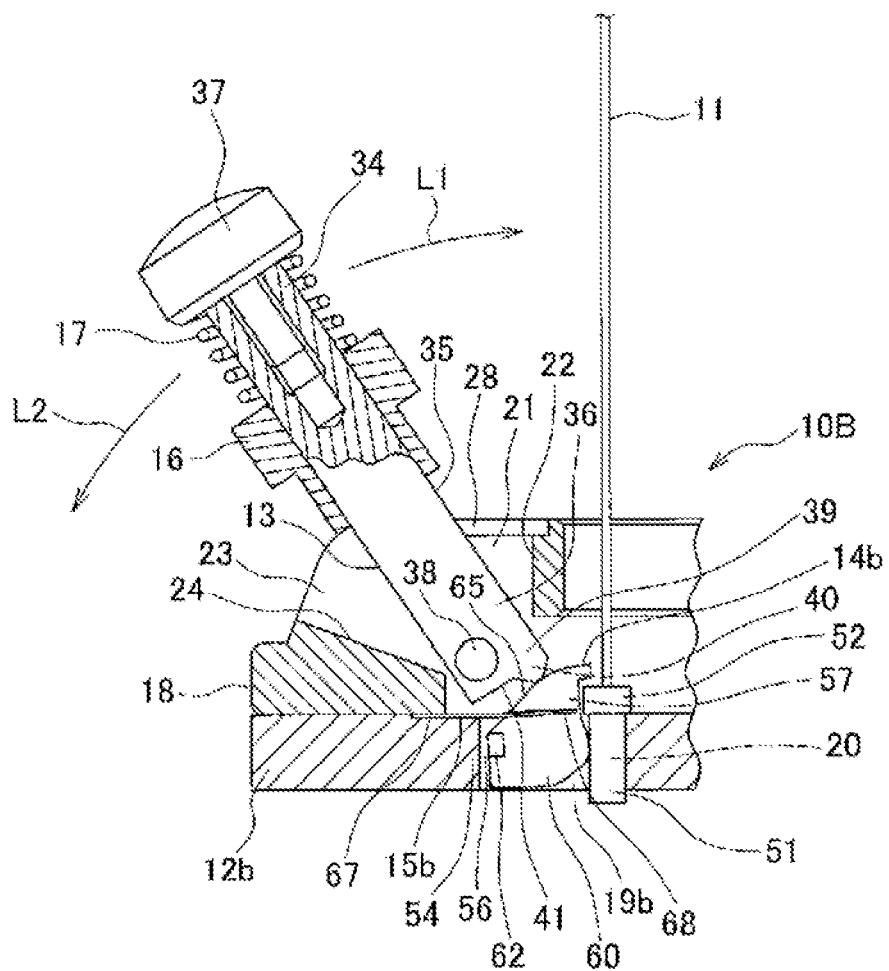
FIG. 14 is a cross-sectional view which is similar to FIG. 7 showing the pivoting rod in the half-pivoted state.
Figure 15:
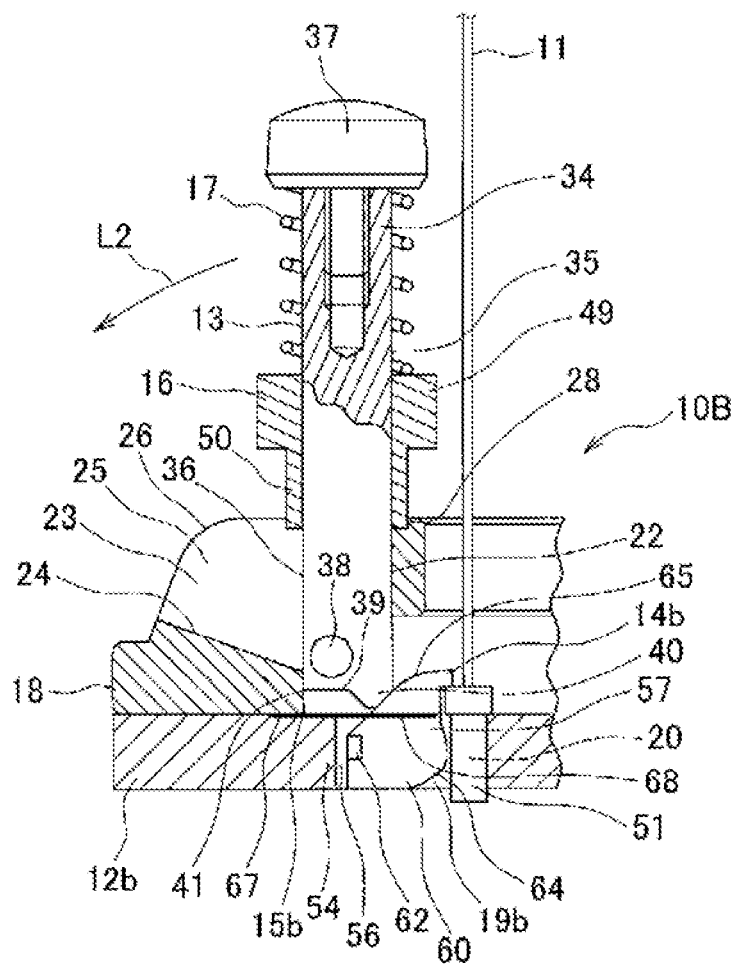
FIG. 15 is a cross-sectional view which is similar to FIG. 9 when the pivoting rod is pivoted to the upright state.

FIG. 14 is a cross-sectional view which is similar to FIG. 7 showing the pivoting rod 13 in the half-pivoted state. FIG. 15 is a cross-sectional view which is similar to FIG. 9 when the pivoting rod 13 is pivoted to the upright state. In FIG. 14, the inward radial direction (first direction) is indicated by the arrow L1, and the outward radial direction (second direction) is indicated by the arrow L2. In FIG. 15, the outward radial direction (second direction) is indicated by the arrow L2.

The procedure to fix the optical fiber ferrule 51 to the optical fiber ferrule polishing jig 10B will be described below. After the optical fiber ferrule 51 is inserted to the insertion hole 20 of the open state in the base 12b, the knob 37 of the pivoting rod 13 is gripped and the pivoting rod 13 of the inclined state is pivoted inward radial direction (first direction) as shown by the arrow L1 in FIG. 12.

When the pivoting rod 13 is pivoted inward radial direction (first direction), the rod 13 is pivoted around the lower end portion 36 from the side opening 23 of the raised portion 18 to the upper opening 21, the intermediate portion 35 of the rod 13 is moved in the pivot-opening 25 of the raised portion 18 as shown in FIG. 14. While the lower end portion 50 of the slide lock 16 rides on the pivoting portion 26 of the raised portion 18, the lower end portion 50 is slid on the pivoting portion 26 and the pivoting rod 13 is moved from the inclined support portion 24 toward the upright support portion 22 of the raised portion 18.

When the pivoting rod 13 is pivoted inward radial direction (first direction), the pressing protrusion 40 formed at the bottom end 39 of the rod 13 presses the inclined surface 65 of the top portion 59 of the fixing piece 14b and the fixing piece 14b is gradually pivoted (moved) around the rotating shaft 62 inward radial direction (first direction) by resisting the biasing force of the spring portion 68 of the flat spring 15b (biasing unit). Thus, the front portion 57 and the top portion 59 of the fixing piece 14b are pivoted inward radial direction (first direction) and the front portion 57 and the top portion 59 gradually approach the insertion hole 20.

According to the optical fiber ferrule polishing jig 10B, when the pivoting rod 13 is pivoted from the inclined state to the upright state, pressing protrusion 40 of the rod 13 slides and presses the inclined surface 65 of the fixing piece 14b. Therefore, the fixing piece 14b can be smoothly pivoted (moved) inward radial direction (first direction) by resisting the biasing force of the spring portion 68 of the flat spring 15b. Thus, it is possible to surely pivot the fixing piece 14b around the rotating shaft 62 inward radial direction (first direction) by the pressing protrusion 40 of the rod 13.

When the pivoting rod 13 is pivoted inward radial direction (first direction) from the state of FIG. 14, the rod 13 is moved from the pivoting portion 26 toward the upper opening 21 of the raised portion 18. Thus, the rod 13 is moved from the pivoting portion 26 to the upright support portion 22 and pivoted from the inclined state to the upright state as shown in FIG. 15. As the pivoting rod 13 is pivoted from the inclined state to the upright state, the fixing piece 14b is further pivoted (moved) inward radial direction (first direction), and the front portion 57 of the fixing piece 14b is moved to the insertion hole 20.

When the pivoting rod 13 is pivoted to the upright state, the rod 13 is located in the upper opening 21 of the raised portion 18 and the intermediate portion 35 of the rod 13 abuts with the upright support portion 22 of the raised portion 18. Therefore, the rod 13 is prevented from being further pivoted inward radial direction (first direction). The movement of the slide lock 16 when the pivoting rod 13 is in the upright state is the same movement as in the case of using the optical fiber ferrule polishing jig 10A. The upright state of the rod 13 is maintained by the slide lock 16.

When the pivoting rod 13 is in the upright state in the raised portion 18 and the front portion 57 of the fixing piece 14b is moved to the insertion hole 20, the bottom portion 60 of the fixing piece 14b is located at the bottom of the installation hole 19b and the top portion 52 of the optical fiber ferrule 51 fits in the engagement portion 63 of the front portion 57 of the fixing piece 14b as shown in FIG. 15. The top portion 52 of the optical fiber ferrule 51 fits in the engagement portion 63. Therefore, the optical fiber ferrule 51 can be fixed to the insertion hole 20 of the base 12b so as not to be moved freely, and the optical fiber ferrule 51 can be fixed so as not to be escaped from the insertion hole 20.

According to the optical fiber ferrule polishing jig 10B, the entered state of the lower end portion 50 of the slide lock 16 with respect to the lock hole 28 is maintained by the biasing force of the coil spring 17, and the upright state of the pivoting rod 13 is maintained. Therefore, the rod 13 is not carelessly pivoted outward radial direction (second direction), and the fixing of the optical fiber ferrule 51 to the insertion hole 20 is not carelessly released. Thus, the fixing of the optical fiber ferrule 51 to the insertion hole 20 by the fixing piece 14b can be maintained.

According to the optical fiber ferrule polishing jig 10B, when the pivoting rod 13 is pivoted to the upright state, the top portion 52 of the optical fiber ferrule 51 fits in the engagement portion 63 formed in the front portion 57 of the fixing piece 14b. Therefore, the optical fiber ferrule 51 can be fixed to the insertion hole 20 by the engagement portion 63 of the fixing piece 14b so as not to be moved freely, and the optical fiber ferrule 51 can be fixed so as not to be escaped from the insertion hole 20.

The procedure to remove the optical fiber ferrule 51 from the insertion hole 20 will be described below. First, the knob portion 49 of the slide lock 16, which is inserted around the pivoting rod 13 and in the upright state, is gripped and the slide lock 16 is moved toward the upper end portion 34 of the rod 13 by resisting the biasing force of the coil spring 17. Thus, the lower end portion 50 of the slide lock 16 is pulled out from the lock hole 28. Next, the knob 37 of the pivoting rod 13 is gripped while the knob portion 49 is gripped, and the pivoting rod 13 which is in the upright state is pivoted outward radial direction (second direction) as indicated by the arrow L2 in FIG. 15.

When the pivoting rod 13 is pivoted outward radial direction (second direction), the movement of the rod 13 is the same as in the case of the optical fiber ferrule polishing jig 10A. When the pivoting rod 13 is pivoted outward radial direction (second direction), the pressing protrusion 40 formed at the bottom end 39 of the rod 13 is moved upward on the inclined surface 65 of the top portion 59 of the fixing piece 14b, and the fixing piece 14b is gradually pivoted (moved) around the rotating shaft 62 outward radial direction (second direction) by the biasing force of the spring portion 68 of the flat spring 15b (biasing unit). Thus, the front portion 57 and the top portion 59 of the fixing piece 14b is pivoted outward radial direction (second direction) and the front portion 57 and the top portion 59 are gradually spaced away from the insertion hole 20 (shown in FIG. 14).

When the pivoting rod 13 is further pivoted outward radial direction (second direction), the rod 13 is moved in the pivoting portion 26 toward the side opening 23 of the raised portion 18, and the rod 13 is moved from the pivoting portion 26 to the inclined support portion 24. Therefore, the rod 13 is pivoted from the upright state to the inclined state. As the pivoting rod 13 is pivoted from the upright state to the inclined state, the fixing piece 14b is further pivoted outward radial direction (second direction), and the front portion 57 of the fixing piece 14b is spaced away from the insertion hole 20.

When the pivoting rod 13 is pivoted to the inclined state, the rod 13 is located in the side opening 23 of the raised portion 18 and the intermediate portion 35 of the rod 13 abuts with the inclined support portion 24 of the raised portion 18. Therefore, the rod 13 is prevented from being pivoted outward radial direction (second direction). When the pivoting rod 13 is moved to the inclined support portion 24 of the raised portion 18, the bottom portion 60 of the fixing piece 14b is spaced away from the lower portion of the installation hole 19b to the upper portion of the installation hole 19b, and the front portion 57 of the engagement portion 63 of the fixing piece 14b is spaced away outward radial direction (second direction) from the top portion 52 of the optical fiber ferrule 51. Thus, the fixing of the optical fiber ferrule 51 with respect to the insertion hole 20 of the base 12b is released (shown in FIG. 12).

After the fixing of the optical fiber ferrule 51 to the insertion hole 20 is released, the optical fiber ferrule 51 is removed from the insertion hole. According to the optical fiber ferrule polishing jig 10B, the pivoted (moved) state of the fixing piece 14b is maintained by the biasing force of the spring portion 68 of the flat spring 15b and the open state of the insertion hole 20 is maintained. Therefore, the optical fiber ferrules 51 can be smoothly inserted to the insertion holes 20, and the optical fiber ferrules 51 can be smoothly removed from the insertion holes 20.

According to the optical fiber ferrule polishing jig 10B, as the pivoting rod 13 is pivoted from the inclined state to the upright state (pivoted inward radial direction (first direction)), fixing piece 14b is pivoted inward radial direction (first direction) by resisting the biasing force of the spring portion 68 of the flat spring 15b (biasing unit), and the top portion 52 of the optical fiber ferrule 51 fits in the engagement portion 63 formed in the front portion 57 of the fixing piece 14b. Therefore, the optical fiber ferrule 51 can be fixed with respect to the insertion hole 20 by the engagement portion 63 of the fixing piece 14b so as not to be moved freely and at the same time, the optical fiber ferrule 51 can be fixed so as not to be escaped from the insertion hole 20. Thus, the optical fiber ferrule 51 can be fixed with respect to the insertion hole 20 only by the operation of pivoting the rod 13 inward radial direction (first direction). And it is possible to simply and easily fix the optical fiber ferrule 51 with respect to the insertion hole 20 without requiring labor and time for the fixing of the optical fiber ferrule 51 with respect to the insertion hole 20.

According to the optical fiber ferrule polishing jig 10B, as the pivoting rod 13 is pivoted from the upright state to the inclined state (pivoted outward radial direction (second direction)), the fixing piece 14b is pivoted outward radial direction (second direction) by the biasing force of the spring portion 68 of the flat spring 15b (biasing unit) and the engagement portion 63 of the fixing piece 14b is disengaged from the top portion 52 of the optical fiber ferrule 51 and the fixing of the optical fiber ferrule 51 by the fixing piece 14b is released. Therefore, the fixing of the optical fiber ferrule 51 with respect to the insertion hole 20 by the fixing piece 14b can be released only by the operation of pivoting the rod 13 outward radial direction (second direction). Thus, it is possible to simply and easily release fixing of the optical fiber ferrule 51 from the insertion hole 20 without requiring labor and time to release fixing of the optical fiber ferrule 51.

According to the optical fiber ferrule polishing jig 10B, the optical fiber ferrules 51 are fixed to the insertion holes 20 by the engagement portion 63 of the fixing pieces 14b so as not to be moved freely and the optical fiber ferrules 51 are fixed so as not to be escaped from the insertion holes 20. Therefore, the fixing condition of each optical fiber ferrule 51 with respect to each insertion hole 20 can be the same in all the optical fiber ferrules 51 and it is possible to uniformly perform polishing the optical fiber ferrules 51.

The present application claims priorities of Japanese Patent Application No. 2016-051874, filed Mar. 16, 2016 and Japanese Patent Application No. 2016-245415, filed Dec. 19, 2016. The entire disclosure of Japanese Patent Application No. 2016-051874 and Japanese Patent Application No. 2016-245415 is incorporated by reference in this International Patent Application.

The above described explanations about the specific embodiment of the present application are made for the purpose of showing examples. The explanations are not intended to be exhaustive and not intended to limit the invention to the embodiment as it is described. It is obvious for those skilled in the art that various modification and change are possible according to the above descriptions.

DESCRIPTION OF THE REFERENCE NUMERALS

10A: optical fiber ferrule polishing jig,
10B: optical fiber ferrule polishing jig,
11: optical fiber,
12a: base,
12b: base,
13: pivoting rod,
14a: fixing piece,
14b: fixing piece,
15a: coil spring (biasing unit),
15b: flat spring (biasing unit),
16: slide lock,
17: coil spring,
18: raised portion,
19a: installation recess (installation portion),
19b: installation hole (installation portion),
20: insertion hole,
21: upper opening,
22: upright support portion,
23: side opening,
24: inclined support portion,
25: pivot-opening,
26: pivoting portion,
27: shaft hole,
28: lock hole,
29: rear wall,
30: side wall (both side faces),
31: bottom wall,
32: shaft locking protrusion,
33: shaft hole,
34: upper end portion,
35: intermediate portion,
36: lower end portion,
37: knob,
38: shaft,
39: bottom end,
40: pressing protrusion,
41: remaining surface,
42: front portion,
43: top portion,
44: bottom portion,
45: moving shaft,
46: engagement portion,
47: inclined surface,
48: spring installation hole,
49: knob portion,
50: lower end portion,
51: optical fiber ferrule,
52: top portion,
53: placing member,
54: rear wall,
55: side wall (both side faces),
56: shaft hole,
57: front portion,
58: rear portion,
59: top portion,
60: bottom portion,
61: both side portions,
62: rotating shaft,
63: engagement portion,
64: curved surface,
65: inclined surface,
66: abutment portions,
67: base portion
68: spring portion.

The invention claimed is:

1. A placing member configured to be installed on a base of an optical fiber ferrule polishing jig used for polishing optical fiber ferrules, the placing member comprises:
a raised portion located on the base;
pivoting rods installed so as to be capable of being rotated;
a plurality of slide locks; and
a plurality of coil springs, each of the plurality of coil springs is disposed around a respective pivoting rod of the pivoting rods, and is configured to bias a respective slide lock of the plurality of slide locks toward a bottom end of each respective pivoting rod, wherein
the raised portion comprises:
first support portions, each of the first support portions respectively supporting each of the pivoting rods in a state of being rotated inward in a radial direction of the placing member;
pivot-openings, each of the pivot-openings respectively communicating with each of the first support portions;
second support portions, each of the second support portions respectively communicating with each of the pivot-openings for respectively supporting each of the pivoting rods in a state of being rotated outward in the radial direction of the placing member; and
a plurality of lock holes formed in the raised portion, wherein
each of the first support portions includes an upper opening which is open toward an upper side of the raised portion,
each of the second support portions includes a side opening which is open outward in the radial direction,
each of the plurality of slide locks is disposed around each respective pivoting rod and is slidable along an axial direction of each respective pivoting rod,
each of the plurality of slide locks has a lower end portion configured to enter a respective lock hole of the plurality of lock holes,
in the state of being rotated inward in the radial direction, each of the pivoting rods is located in each upper opening and is supported by an inner wall of the respective upper opening,
in the state of being rotated outward in the radial direction, each of the pivoting rods is located in each side opening and supported by an inner wall of the respective side opening, and
each of the pivoting rods is configured to be rotated between each respective upper opening and side opening.

2. The placing member according to claim 1, wherein the raised portion has a plurality of pivoting portions surrounding each respective pivot-opening.

3. The placing member according to claim 2, wherein each lock hole is respectively formed in at least one of the first support portions and the second support portions.

4. The placing member according to claim 3, wherein the raised portion is formed in an integral annular shape, and the pivoting rods are circularly arranged in the raised portion.

5. The placing member according to claim 2, wherein the raised portion is formed in an integral annular shape, and the pivoting rods are circularly arranged in the raised portion.

6. The placing member according to claim 1, wherein each lock hole is respectively formed in at least one of the first support portions and the second support portions.

7. The placing member according to claim 6, wherein the raised portion is formed in an integral annular shape, and the pivoting rods are circularly arranged in the raised portion.

8. The placing member according to claim 1, wherein the raised portion is formed in an integral annular shape, and the pivoting rods are circularly arranged in the raised portion.

9. The placing member according to claim 1, wherein
at least two of the pivoting rods are arranged on the raised portion, wherein the raised portion is integrally formed.

10. The placing member according to claim 1, wherein a respective rotation axis of each of the pivoting rods is configured to receive a load applied at a lower end portion of each of the pivoting rods for fixing each respective optical fiber ferrule.

\* \* \* \* \*